United States Patent
Lasky et al.

(10) Patent No.: US 12,547,639 B2
(45) Date of Patent: Feb. 10, 2026

(54) ENRICHING EVENT STREAMS WITH ENTITY DATA

(71) Applicant: Twilio Inc., San Francisco, CA (US)

(72) Inventors: Daniel Joseph Lasky, Chattahoochee Hills, GA (US); Akihiro Ishikawa, San Francisco, CA (US); Drew Thompson, San Francisco, CA (US); Jon Anderson, San Francisco, CA (US); Udit Mehta, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/808,541

(22) Filed: Aug. 19, 2024

(65) Prior Publication Data
US 2025/0068641 A1    Feb. 27, 2025

Related U.S. Application Data

(60) Provisional application No. 63/534,030, filed on Aug. 22, 2023.

(51) Int. Cl.
*G06F 16/25* (2019.01)
*G06F 16/27* (2019.01)

(52) U.S. Cl.
CPC ........... *G06F 16/254* (2019.01); *G06F 16/27* (2019.01)

(58) Field of Classification Search
CPC .............................. G06F 16/254; G06F 16/27
USPC ........................................................ 707/602
See application file for complete search history.

(56) References Cited

U.S. PATENT DOCUMENTS

| | | | |
|---|---|---|---|
| 11,269,913 B1* | 3/2022 | Dervay | G06F 16/254 |
| 2016/0026692 A1 | 1/2016 | Cannaliato et al. | |
| 2021/0374143 A1* | 12/2021 | Neill | G06F 16/24568 |
| 2024/0362196 A1* | 10/2024 | Gupta | G06F 16/2448 |

OTHER PUBLICATIONS

"International Application Serial No. PCT US2024 042898, International Search Report mailed Nov. 25, 2024", 4 pgs.

(Continued)

*Primary Examiner* — Robert W Beausoliel, Jr.
*Assistant Examiner* — Lauren Zannah Ganger
(74) *Attorney, Agent, or Firm* — Schwegman Lundberg & Woessner, P.A.

(57) ABSTRACT

System and method for enriching a data stream with enrichment data. The system loads data from one or more customer data warehouses into a storage component using an ingest pipeline; receives, at an enrichment pipeline, an incoming data stream; determines, using the enrichment pipeline, an insertion point within the incoming data stream, the insertion point corresponding to a data object mention; determines, using the enrichment pipeline, enrichment data matching the data object mention, the enrichment data being retrieved from the storage component; augments, via the enrichment pipeline, the incoming data stream with the enrichment data at the determined insertion point to generate an enriched data stream, and transmits the enriched data stream to one or more destinations. The data stream can be an event stream. The enrichment data can be entity data. The system can use a reverse extract/transform/load (ETL) model to enable data ingesting and/or data stream enrichment.

18 Claims, 14 Drawing Sheets

(56) References Cited

OTHER PUBLICATIONS

"International Application Serial No. PCT US2024 042898, Written Opinion mailed Nov. 25, 2024", 7 pgs.

Barrera, Thalia, "What is Reverse ETL?: Concepts, Use Cases and Integration", [Online]. Retrieved from the Internet: https: airbyte.com blog reverse-etl, (Aug. 25, 2022).

Ehab, Qadah, "An Introduction to Stream Processing with Apache Flink | by Ehab Qadah | Towards Data Science", (Jan. 7, 2020).

* cited by examiner

ENRICHING EVENT STREAMS WITH ENTITY DATA

CROSS-REFERENCE TO RELATED APPLICATIONS

This application claims the benefit of U.S. Provisional Application Ser. No. 63/534,030, filed on Aug. 22, 2023, which is incorporated herein by reference in its entirety.

TECHNICAL FIELD

The disclosed subject matter relates generally to the technical field of data stream processing and, in one specific example, to a system for enriching event streams with entity data from a data warehouse.

BACKGROUND

Developers and users of customer data platforms are interested in exploring and expanding the types of uses for the data stored in data warehouses. The comprehensive and efficient use of such data can bring benefits to marketers or retailers, as well as to users who will enjoy a better outreach, marketing or retail experience.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
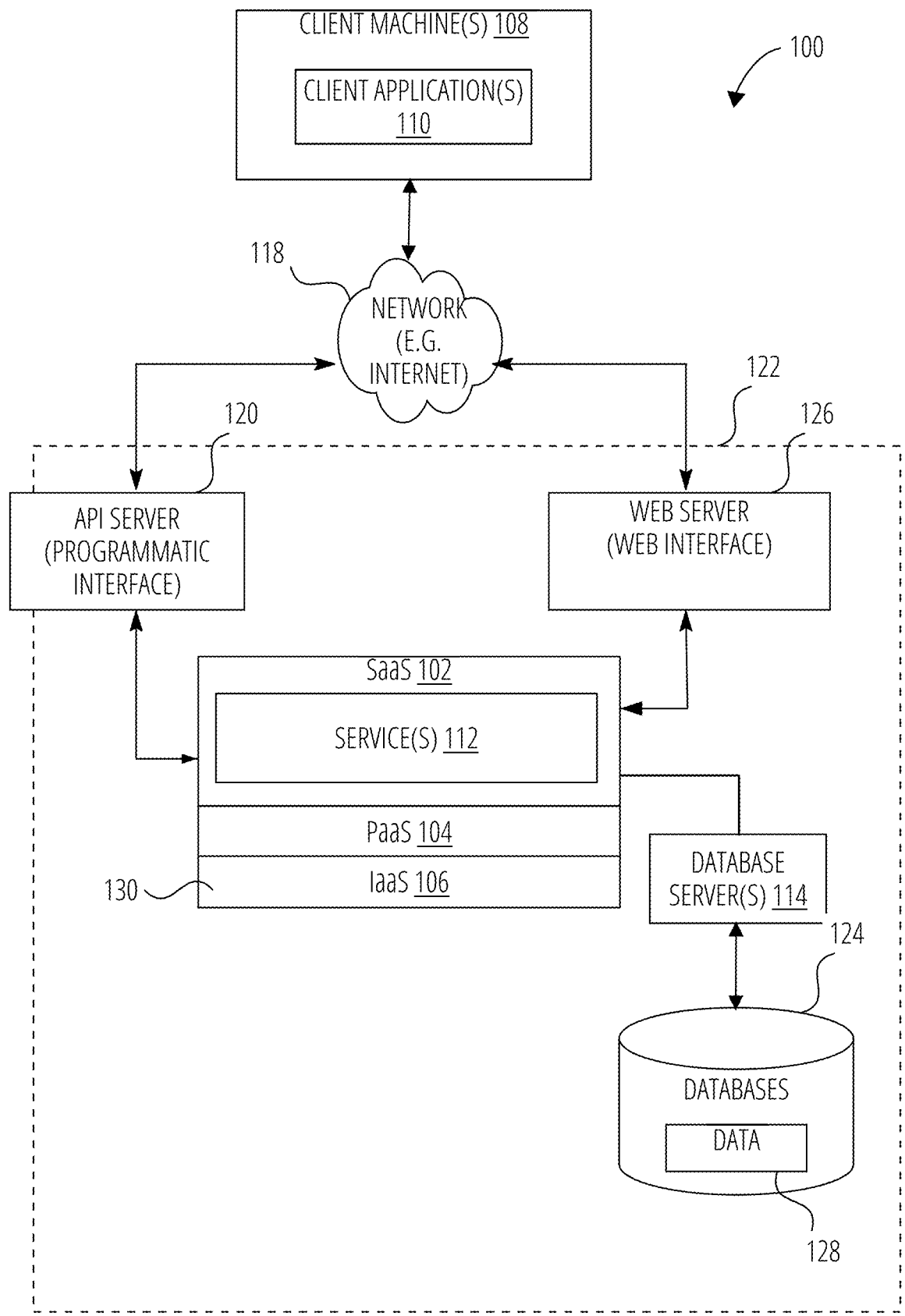
FIG. 1 is a network diagram illustrating a system within which various example embodiments may be deployed.

Data warehouses (DWHs) are increasingly critical elements of architectures for businesses or organizations, as is the ability to bring some or all DWH components into a customer data platform (CDP). Many use cases for a CDP require capabilities such as near real-time enrichment of data streams passing through the data plane of a CDP with additional data from customer DWH tables. For example, event streams can require near real-time enrichment, augmentation or modification using entity data from customer DWH tables. Some current solutions that integrate DWH data into CDPs allow customers to stream rows from their DWH tables directly into destinations, for example by using a reverse ETL (extract/transform/load) architecture. However, they do not provide scalable, customized, near real-time enrichment of data streams that leverages customer DWH data. Thus, there is a need for a system that can enrich data streams (such as event streams) with customer DWH data in near real-time and/or in a highly customizable manner.

The embodiments described herein refer to a stream enrichment system that enriches, augments or modifies data streams using customer DWH data, in near real-time. The data stream can be an event stream, where events can include purchase events, click events, page visit events or page view events, cart addition events and so forth. The data from the customer DWH can be entity data. Entities are real-world or business objects (pets, products, tickets, appointments, etc.) that provide context for customers such as retailers, marketers, organizations and so forth. Entity data stored in the customer DWH is loaded or ingested into a target CDP to create entity models. Entity models include tables with columns that contain information about the entity object. For example, a "Product" entity table captures details about products via values of table columns such as "product_ID," "product_name," etc. Thus, each table record corresponds to an entity object accessible based on a unique identifier.

In some embodiments, entity data is ingested from one or more customer DWHs into a high-performance cache (e.g., an Amazon DynamoDB cache). In some embodiments, the stream enrichment system augments existing infrastructure, such as a reverse ETL infrastructure, to ingest entity data in an efficient, customizable manner. Given an incoming data stream, a destination (e.g. an action destination) with an enrichment configuration is automatically associated with a node in an execution graph that makes a call to an enrichment endpoint in order to enrich the data stream with entity data as specified by the enrichment configuration. In some embodiments, the enrichment endpoint is associated with a dedicated service or API (e.g., an entities service and/or entities API). The enrichment point appends, at an automatically determined insertion point into the data stream, a matching entity data payload retrieved from the high-performance cache. Thus, the incoming data stream is augmented with relevant additional information. For example, an entity mention or reference associated with an event in an event stream is augmented with attributes of the respective entity, and so forth. The one or more enriched data stream samples are sent to the destination. In some embodiments, entity models are made accessible to other downstream systems (e.g., Destinations (Actions), Profiles, Engage/Audience/Journey, or other engagement apps).

In some embodiments, the stream enrichment system uses an ingest pipeline to load data from one or more customer data warehouses into a storage component, such as a high-performance, cache. The ingest pipeline includes a scheduler component that determines at least one of a timing or a frequency of data synchronization operations between the one or more customer data warehouses and the storage component. The ingest pipeline includes a loader component that receives, from the scheduler component, synchronization information corresponding to a job to be executed as part of an data ingest task. Upon receiving this synchronization information, the loader component creates a second job for a data processing engine, the second job being associated with an application programming interface (API) of the storage component. The stream enrichment system executes the second job, resulting in executing a data write, data retrieval or data deletion operation associated with the storage component.

In some embodiments, the stream enrichment system receives, at an enrichment pipeline, an incoming data stream, such as an entity stream. The enrichment pipeline can use a data processing engine associated with an execution plan. Upon receiving the incoming data stream and detecting that a downstream component is configured to receive an enriched version of the data stream, the enrichment pipeline adds an execution graph node to the execution plan for the data processing engine, the execution graph node associated with a call to an enrichment endpoint for an API of the storage component. The enrichment pipeline determines an insertion point within the incoming data stream, the insertion point corresponding to a data object mention. In some embodiments, the data object mention corresponds to an entity ID. Determining the insertion point within the incoming data stream includes detecting the entity ID in the incoming data stream using the enrichment endpoint for the API of the storage component. The storage component stores entity data, including the entity ID. The stream enrichment system determines, via the enrichment endpoint, enrichment data matching the data object mention, the enrichment data being retrieved from the storage component. The stream enrichment system augments, using the enrichment pipeline, the incoming data stream with the enrichment data at the determined insertion point to generate an enriched data stream. The system transmits the enriched data stream to one or more destinations.

In some embodiments, the stream enrichment system creates a source corresponding to a table in a customer data warehouse, the source associated with an entity model. The stream enrichment system creates a destination to receive the enriched data stream. The stream enrichment system creates a model (e.g., a reverse extract-transform-load (ETL) model) associated with the entity model and/or source. The reverse ETL model includes a relational query comprising column information or table information for the table corresponding to the source in the customer data warehouse. The reverse ETL model also includes information related to a synchronization schedule associated with the table corresponding to the source in the customer DWH. The stream enrichment system creates and/or enables at least one mapping between the reverse ETL model and the destination.

Overall, the disclosure herein presents a stream enrichment system that enriches, in near real-time and in a highly customizable manner, data streams (e.g., event streams) using customer DWH data (e.g., entity data). Such a stream enrichment system offers multiple benefits to customers, as described below.

By customizing and/or augmenting a reverse ETL infrastructure, the stream enrichment system enables more efficient, more robust and/or simpler data integration and/or data stream enrichment. Unlike traditional ETL processes that primarily focus on extracting data from various sources and loading it into a data warehouse for later use, the stream enrichment system uses an augmented reverse ETL infrastructure to efficiently extract and/or load relevant data from the customer data warehouse and/or inject it directly into live data streams, augmenting the streams with valuable context without significant delays.

The system dynamically identifies insertion points for an incoming data stream based on a low-cost detection method focused on identifying object mentions (e.g., data object mentions) based on object information available in customer DWH data. By leveraging the wealth of available customer DWH data and/or the ingest and enrichment pipelines, the stream enrichment system can perform fast detection and enrichment of insertion points for the incoming data stream. The low latency of the stream enrichment system makes it suitable for applications where timely data is essential, such as real-time personalized content delivery, advertising delivery, financial domain applications, and so forth.

By using and/or augmenting an extensible data processing engine in connection with the ingest pipeline and/or the enrichment pipeline, the stream enrichment system efficiently manages complex data transformations and routing. The data processing engine can be further customized or extended with additional execution graph nodes to meet specific data processing needs, making the stream enrichment system highly adaptable to various use cases.

Furthermore, CDP users such as marketers enjoy increased access to complete customer data, which leads to better audience creation and/or targeting models. The stream enrichment system is enabled to process user input for data model creation, thereby benefitting from the expertise of not only data teams or also technical marketers and/or analytics engineers, thereby allowing for a broader view and understanding of the data and consideration of all signals (for example, ensuring that privacy is taken into account). The stream enrichment system enables the transmission of enrichment information to one or more downstream systems with a single setup, which reduces data tool and integration overload, and results in faster data activation and/or better data-driven personalization across channels.

These advantages make the system particularly effective for businesses or organizations that need to process large volumes of data in real-time while ensuring that the data is enriched accurately and efficiently to support decision-making processes and operational workflows.

FIGURE SUMMARY

FIG. 1 presents a network diagram showing the interaction between client machines, API and web servers, and various service layers (SaaS, PaaS, IaaS) within a networked system, illustrating the flow of data and services across different components.

Figure 2:
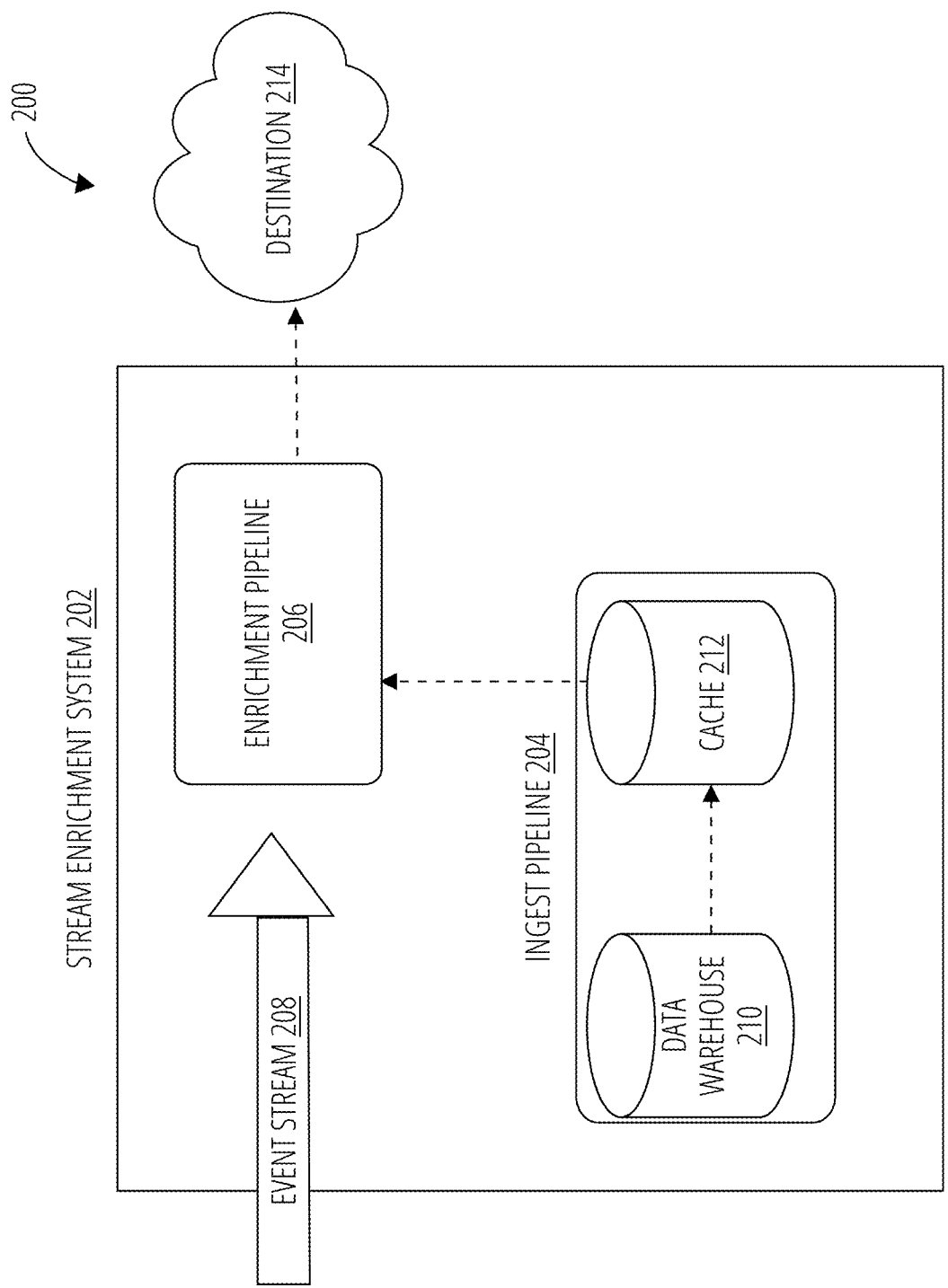
FIG. 2 is a diagrammatic representation of a stream enrichment system, according to some embodiments.

FIG. 2 illustrates a stream enrichment system where a data stream (e.g., an event stream) is processed through an ingest pipeline and an enrichment pipeline, highlighting the flow from a data warehouse to a cache and ultimately to a destination.

Figure 3:
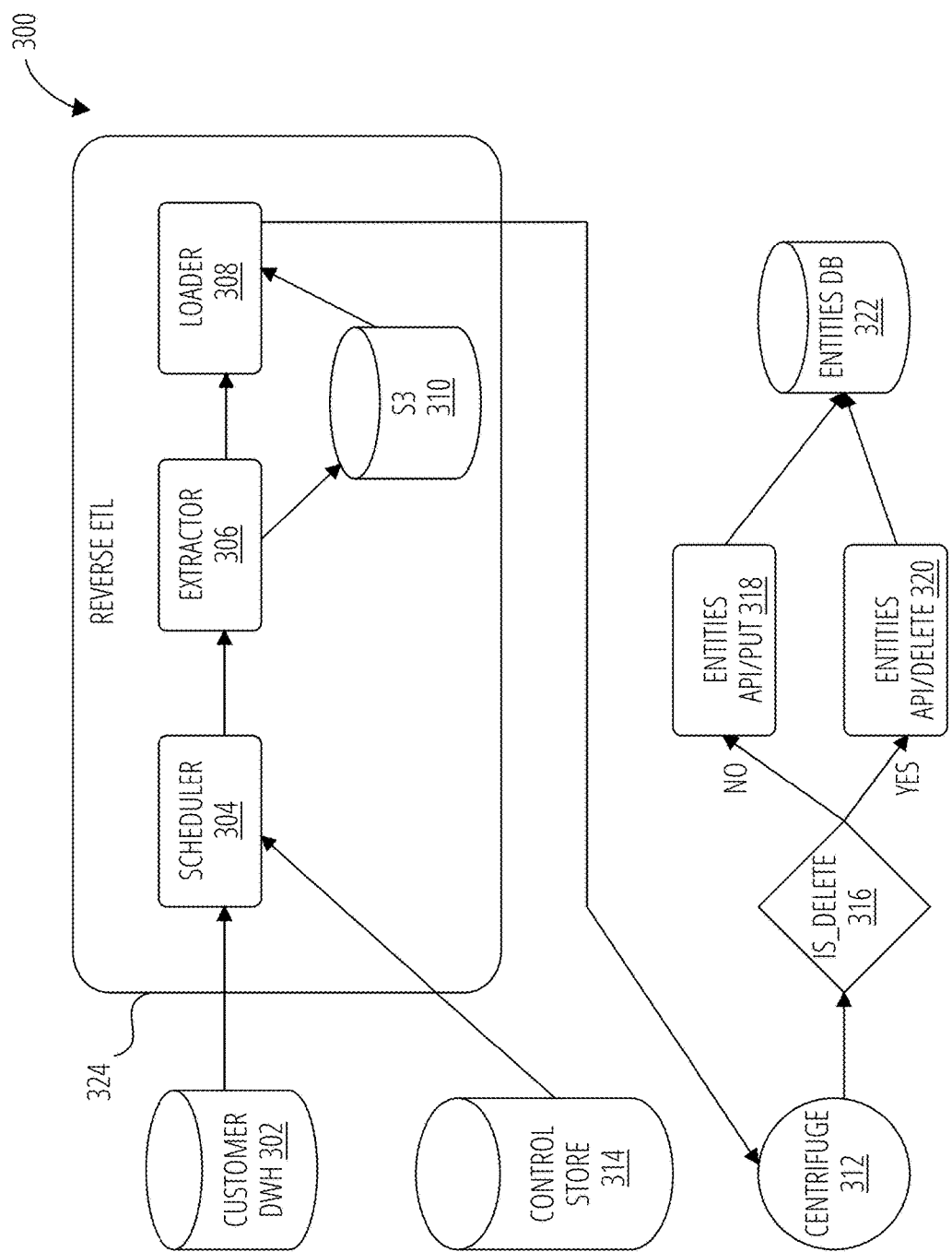
FIG. 3 is a diagrammatic representation of a view of an ingest pipeline, according to some embodiments.

FIG. 3 details components of the ingest pipeline, including the customer DWH, control store, and various processing elements like the scheduler, loader, and centrifuge, which manage the data synchronization and loading into a high-performance cache.

Figure 4:
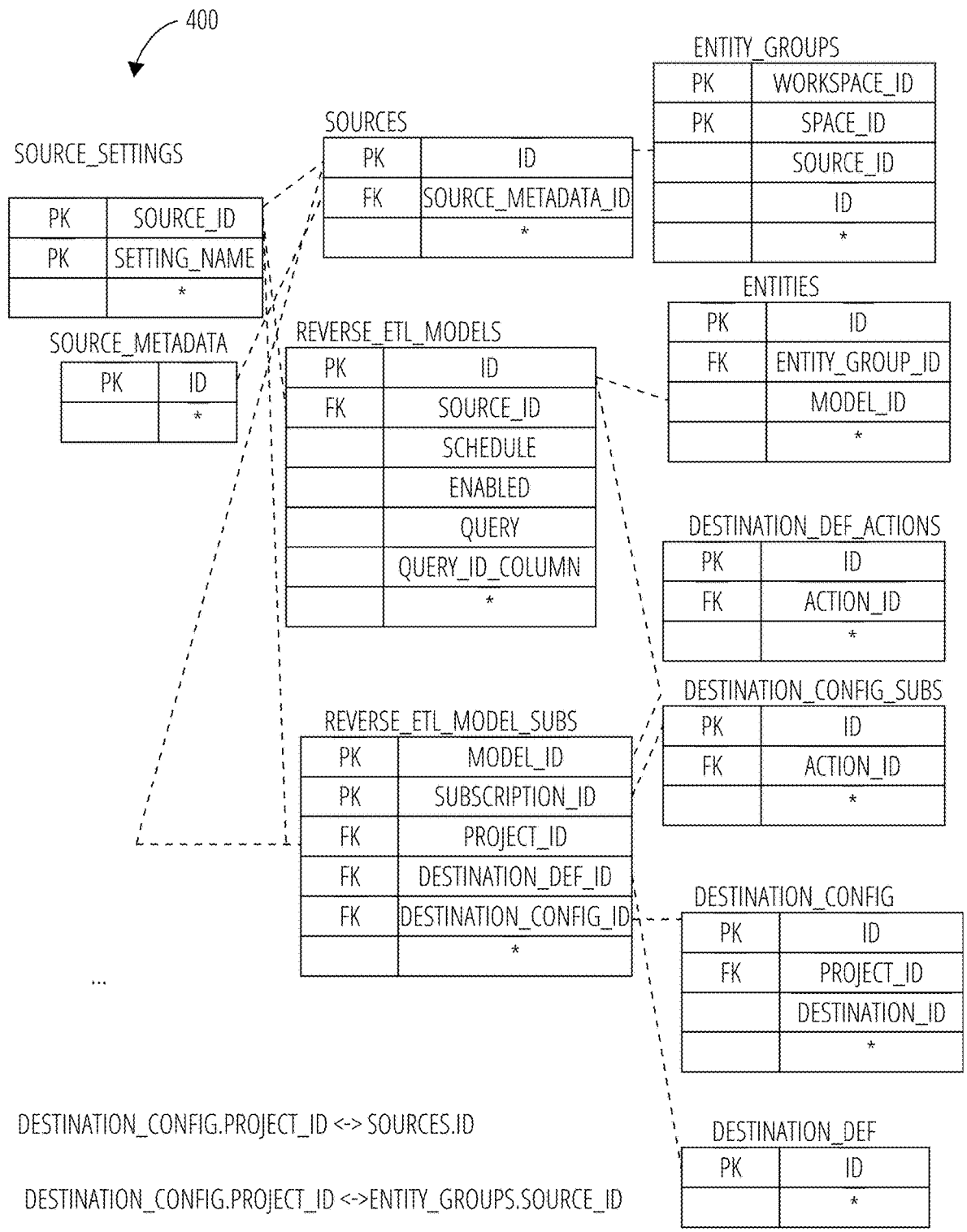
FIG. 4 is a diagrammatic representation of a data model used by a stream enrichment system, according to some embodiments.

FIG. 4 provides a detailed view of the data model used in a reverse ETL architecture, showing relationships between source settings, entities, entity groups, and destination configurations.

Figure 5:
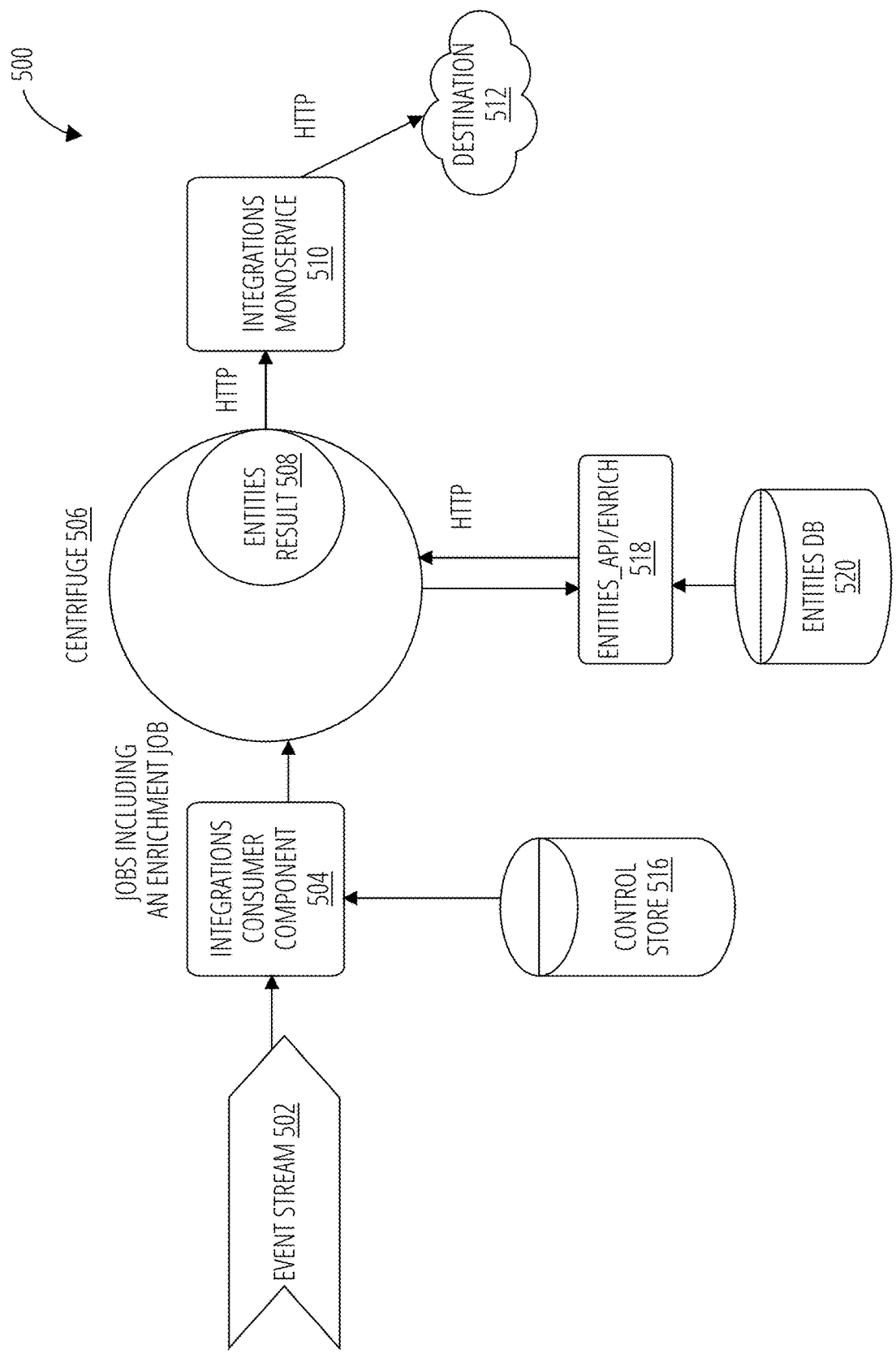
FIG. 5 is a diagrammatic representation of a view of an enrichment pipeline, according to some embodiments.

FIG. 5 depicts the enrichment pipeline where a data stream (e.g., event stream) is augmented with data from a high-performance cache using a data processing engine, and the enriched data is then routed to a destination.

Figure 6:
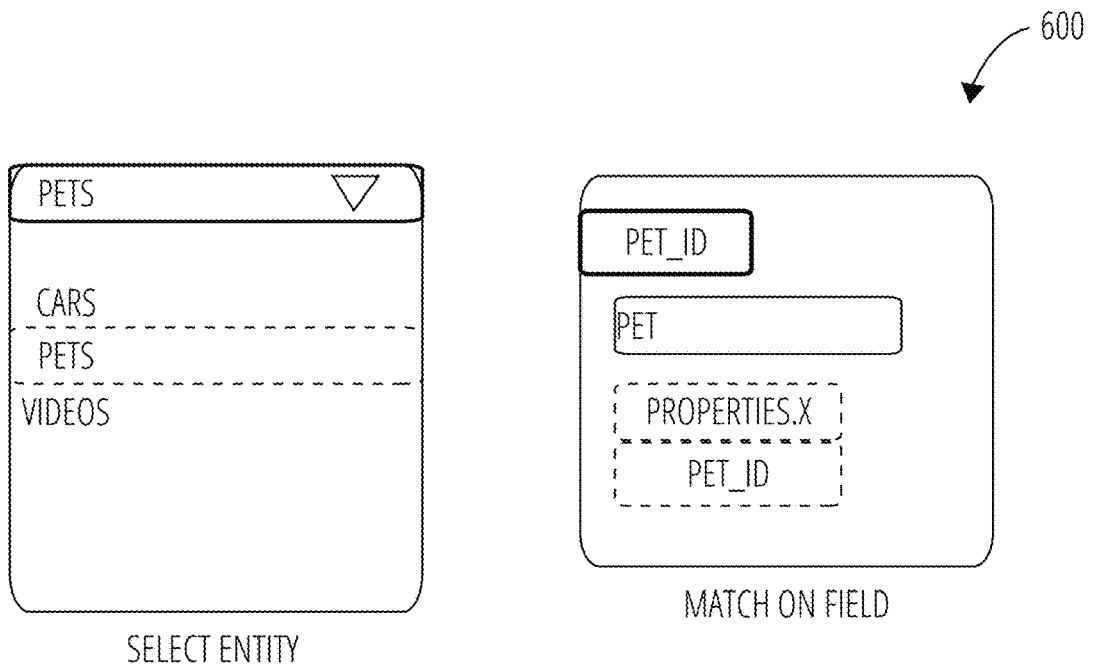
FIG. 6 is an illustration of part of a user interface (UI) for a stream enrichment system, according to some embodiments.

FIG. 6 shows a UI for selecting an entity from a list (e.g., Pets, Cars, Videos) for data stream enrichment, focusing on the entity selection process and the matching field configuration.

Figure 7:
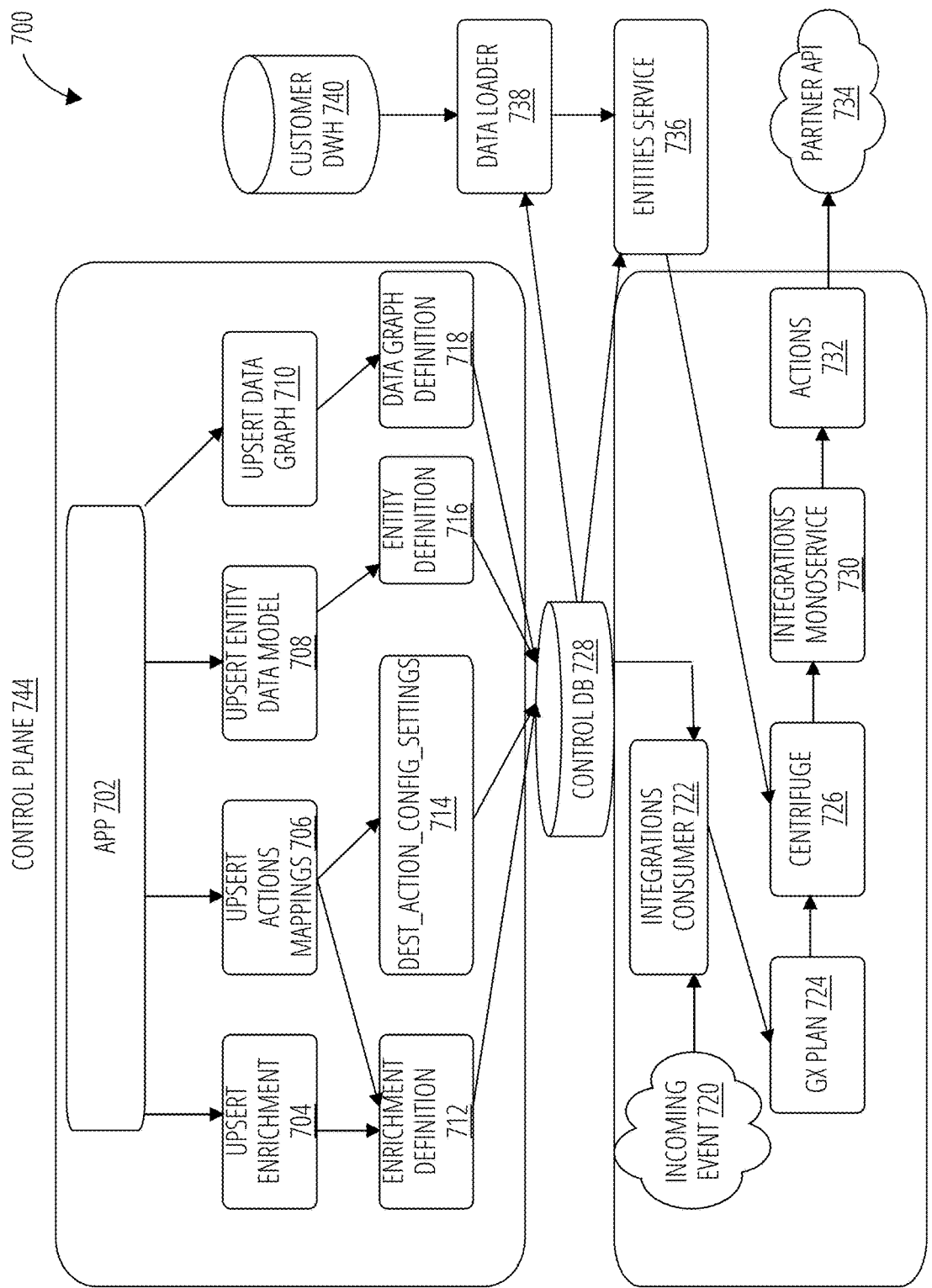
FIG. 7 is a diagrammatic representation of a view of a stream enrichment system, according to some embodiments.

FIG. 7 outlines components of a control plane and of a data plane in the stream enrichment system, showing how data and configurations are managed and applied to enrich data streams.

Figure 8:
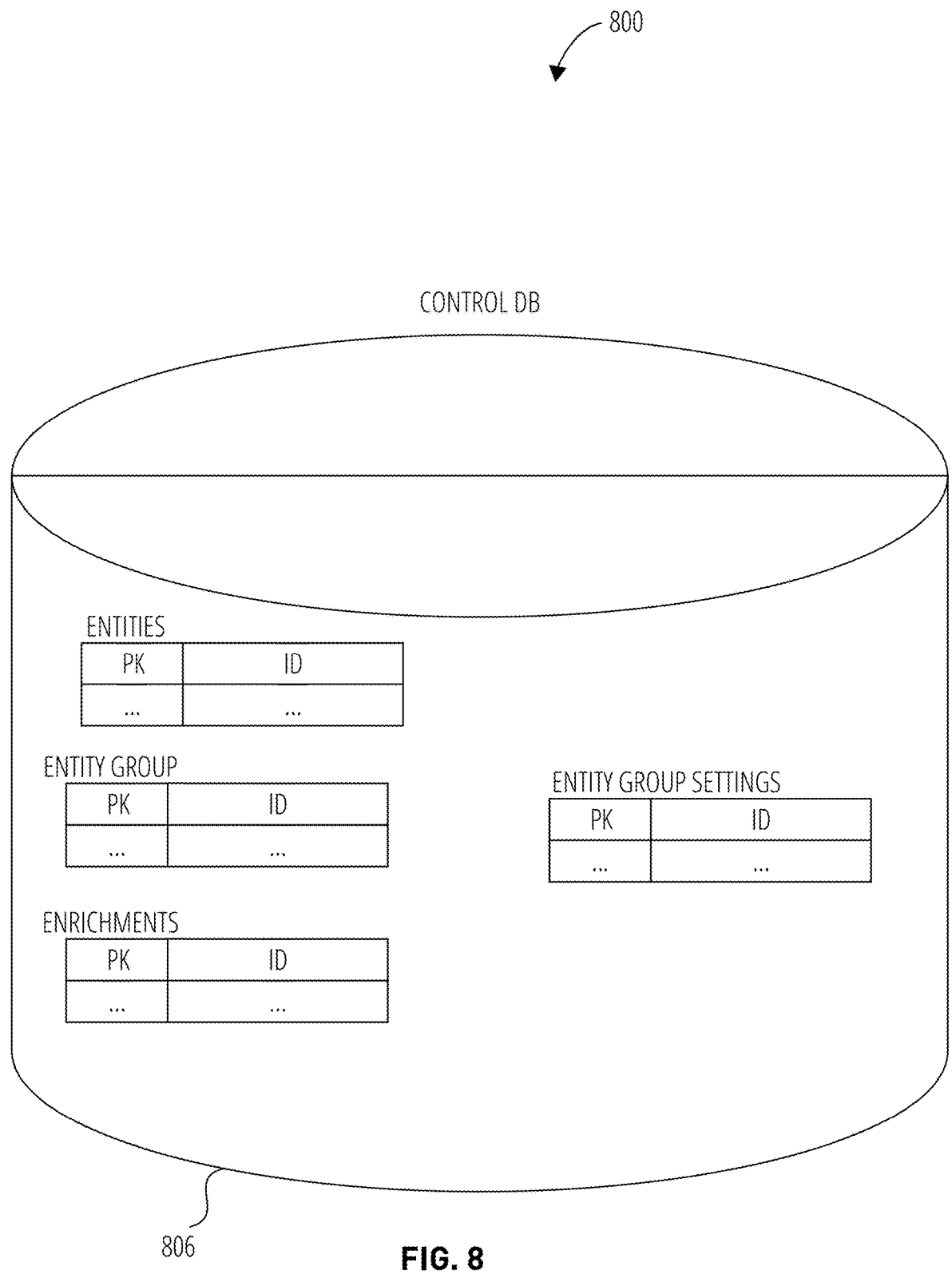
FIG. 8 is a diagrammatic representation of a control database (DB) used by a stream enrichment system, according to some embodiments.

FIG. 8 displays the structure of a control database, detailing tables that store configuration and operational data for the enrichment system.

Figure 9:
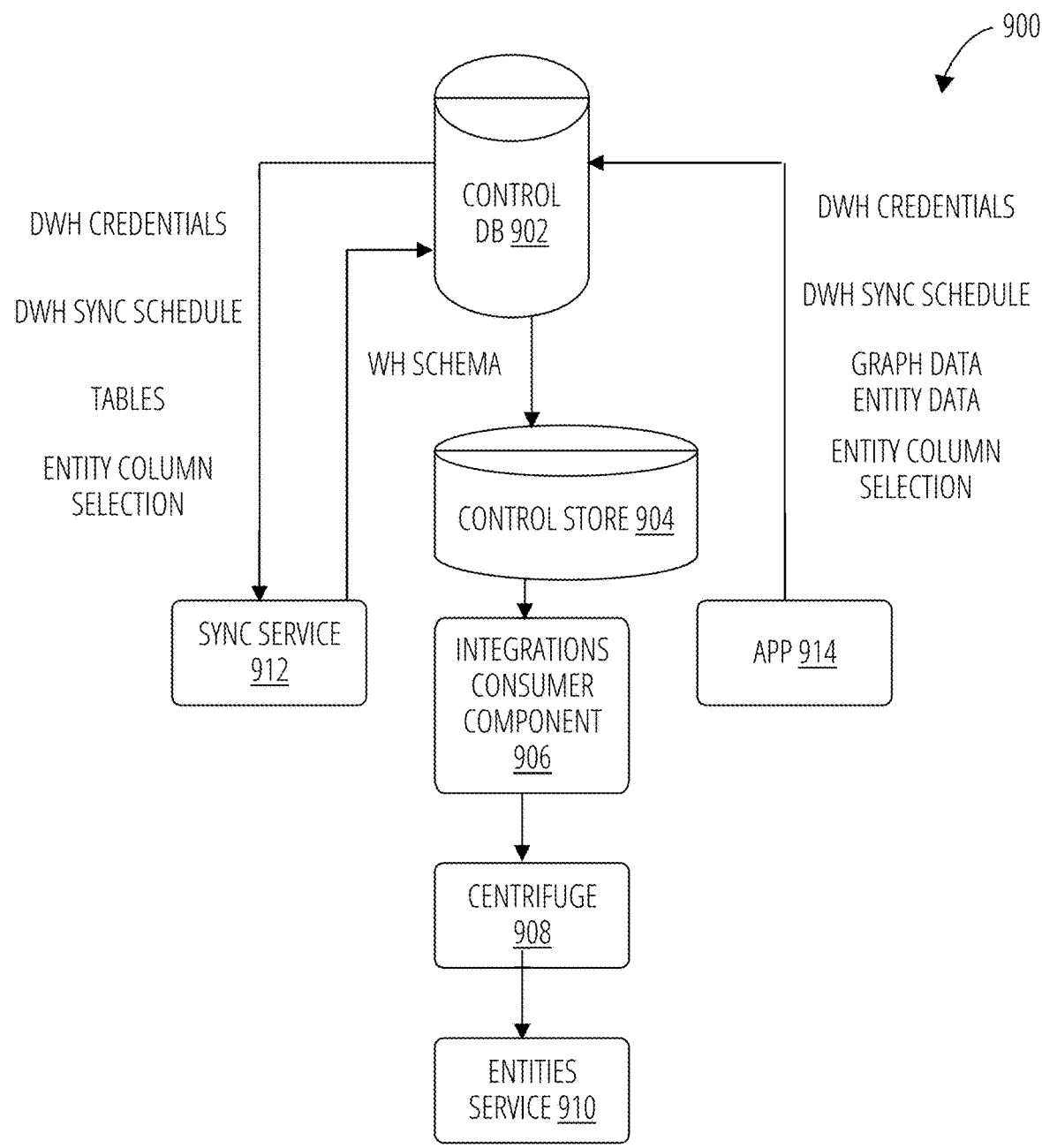
FIG. 9 is a diagrammatic representation of data flows within a stream enrichment system, according to some embodiments.

FIG. 9 illustrates the control plane data flows, showing interactions between various components that manage and synchronize data for enrichment processes.

Figure 10:
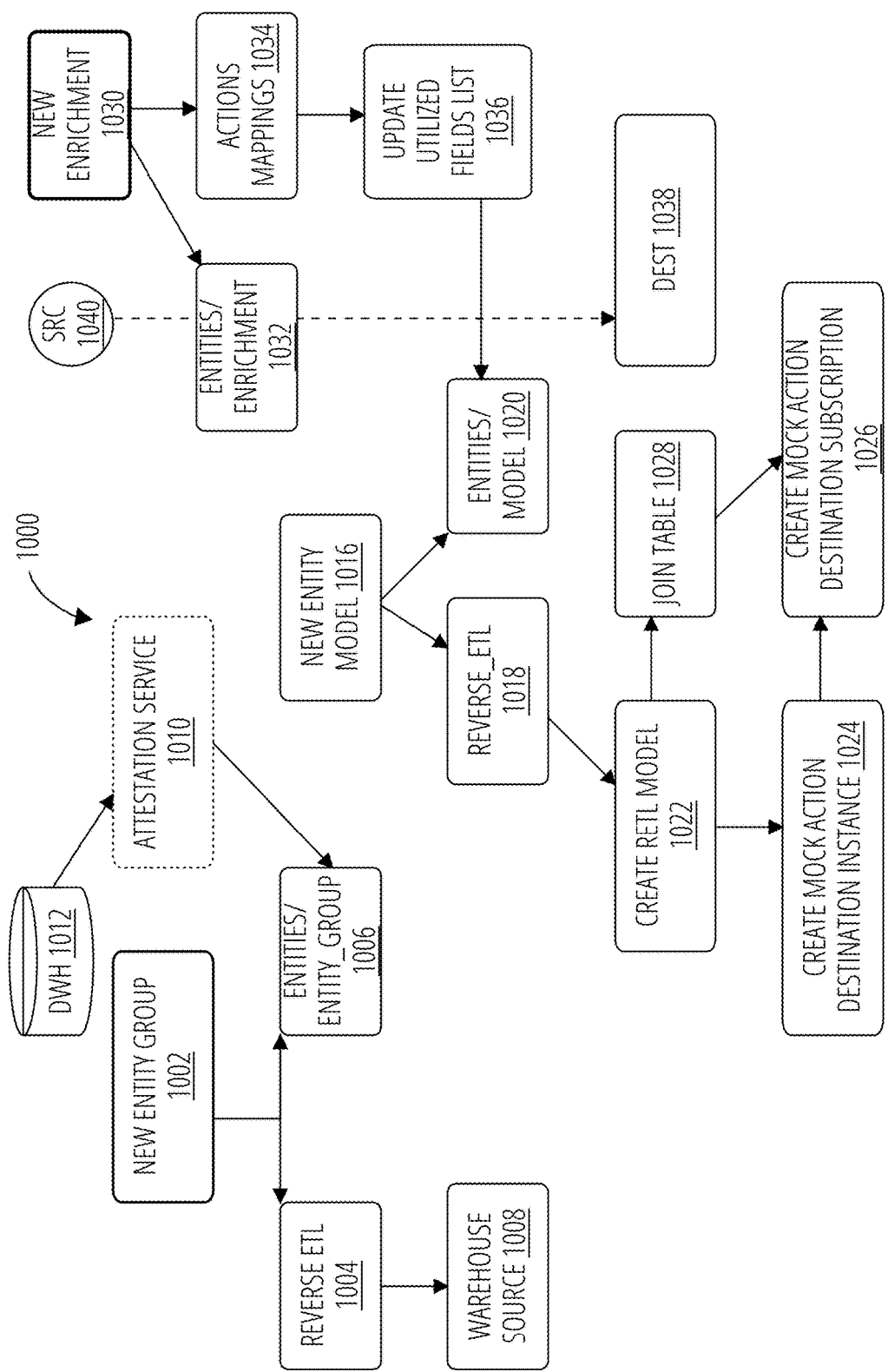
FIG. 10 is a diagrammatic representation of views of partial data flows in a stream enrichment system, according to some embodiments.

FIG. 10 shows views of partial data flows in the stream enrichment system, focusing on the creation of new enrichments, entity groups, and reverse ETL processes.

Figure 11:
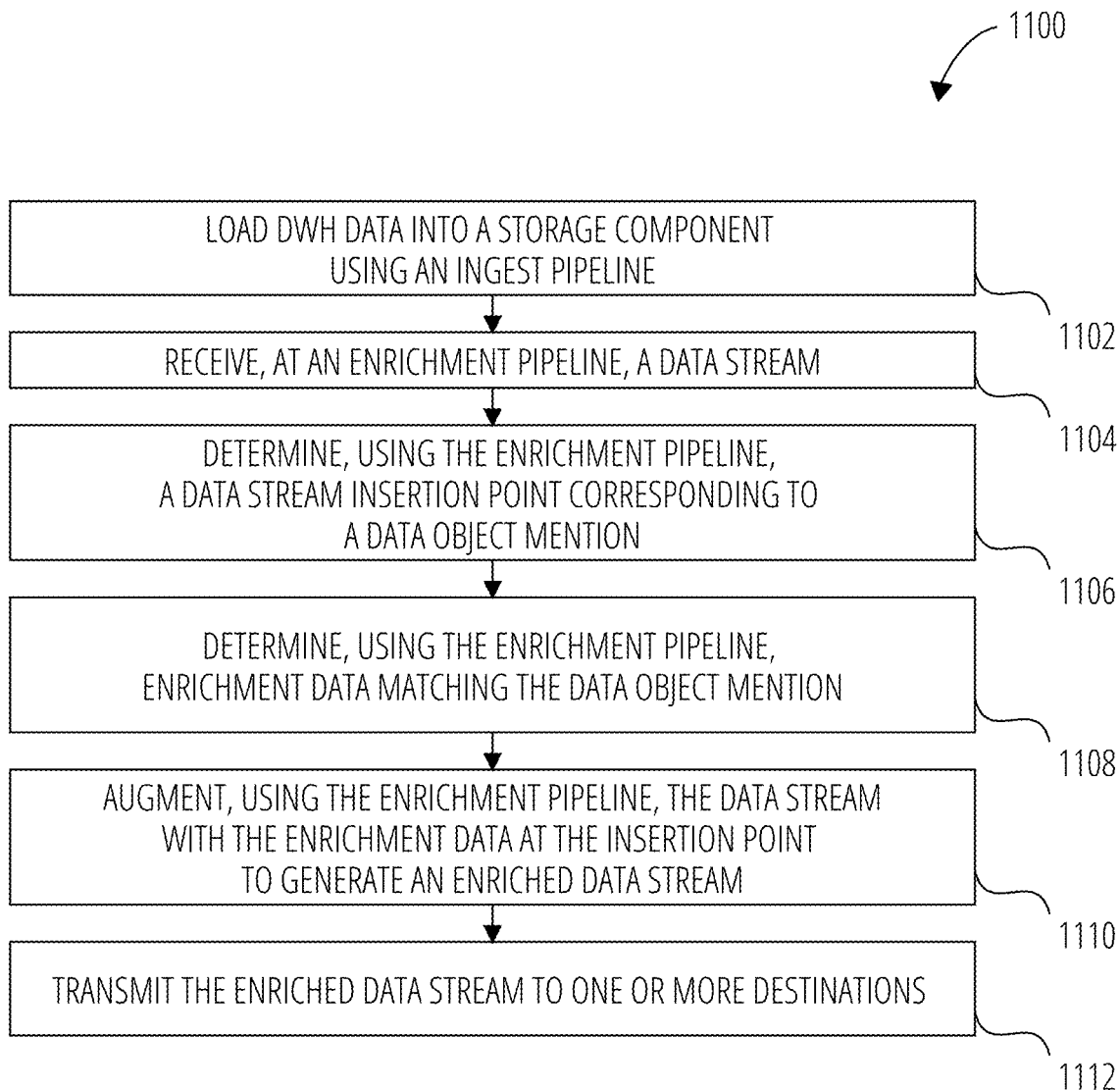
FIG. 11 is a flowchart illustrating a method for a stream enrichment system, according to some embodiments.

FIG. 11 illustrates a method for a stream enrichment system.

Figure 12:
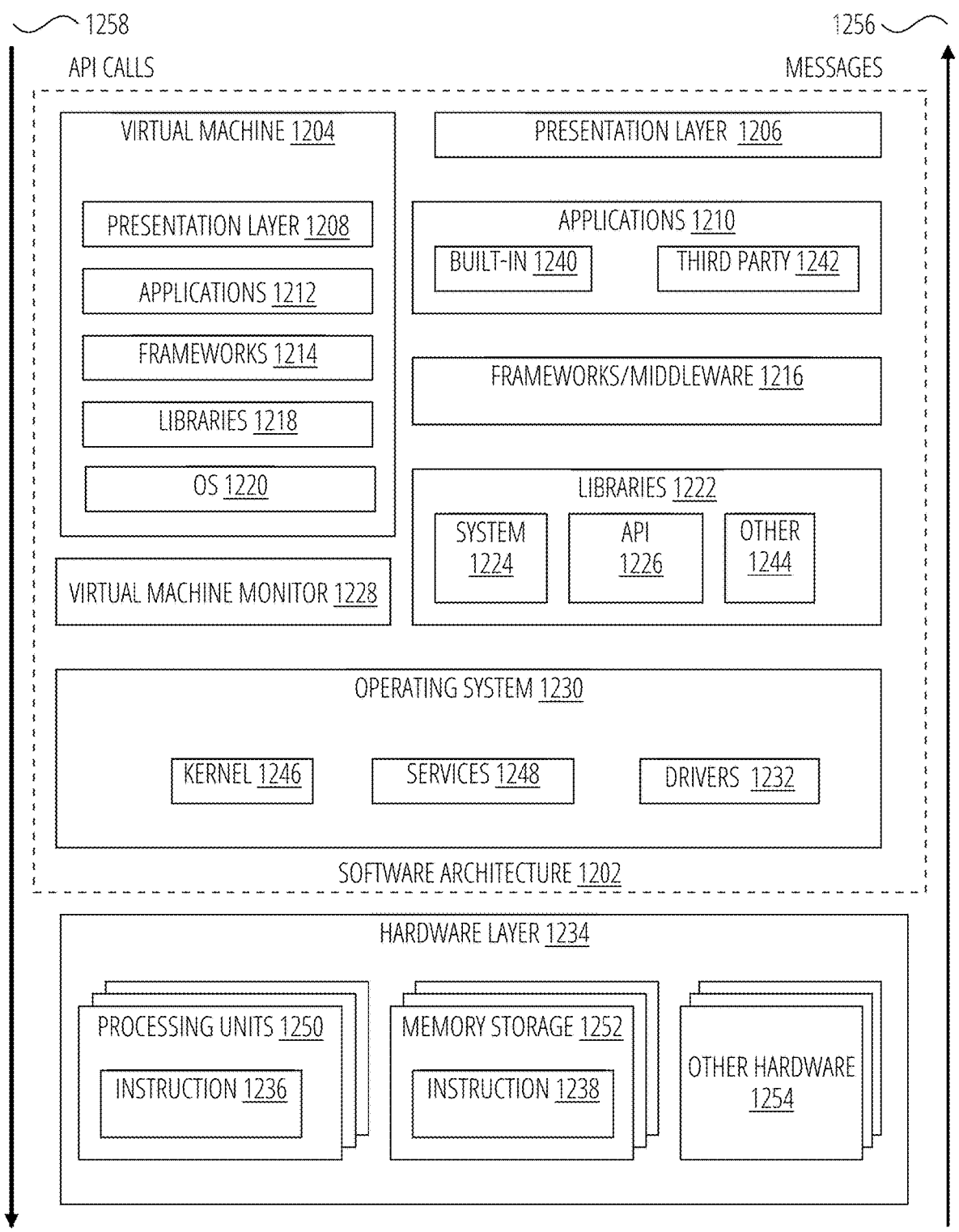
FIG. 12 is a block diagram illustrating an example of a software architecture that may be installed on a machine, according to some embodiments.

FIG. 12 illustrates a software architecture installed on a machine, detailing layers such as the operating system, libraries, frameworks, and applications, which support the execution of methodologies discussed in the system.

Figure 13:
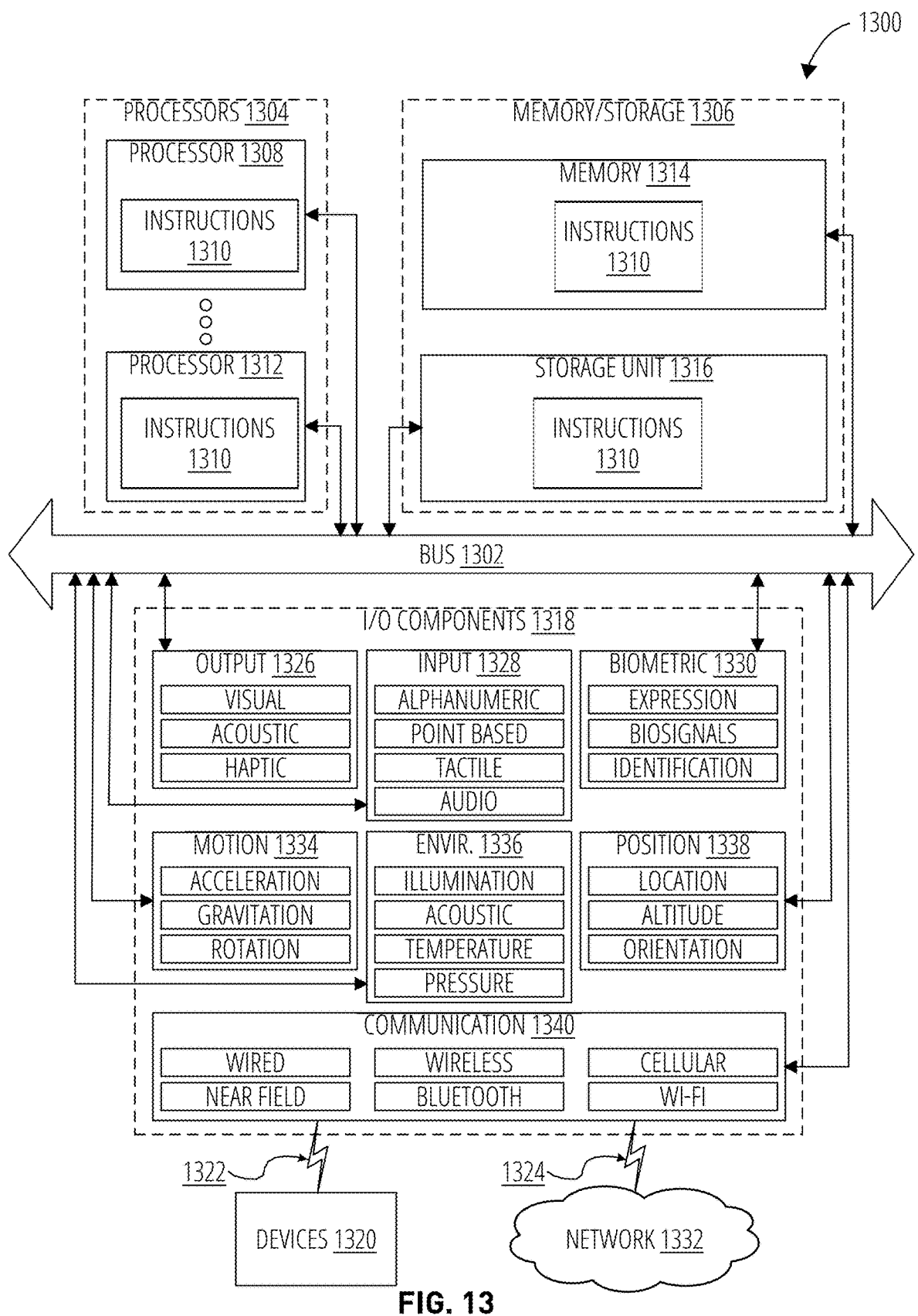
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 provides a block diagram of a machine capable of reading instructions from a machine-readable medium to perform methodologies, highlighting components like processors, memory/storage, and I/O components.

Figure 14:
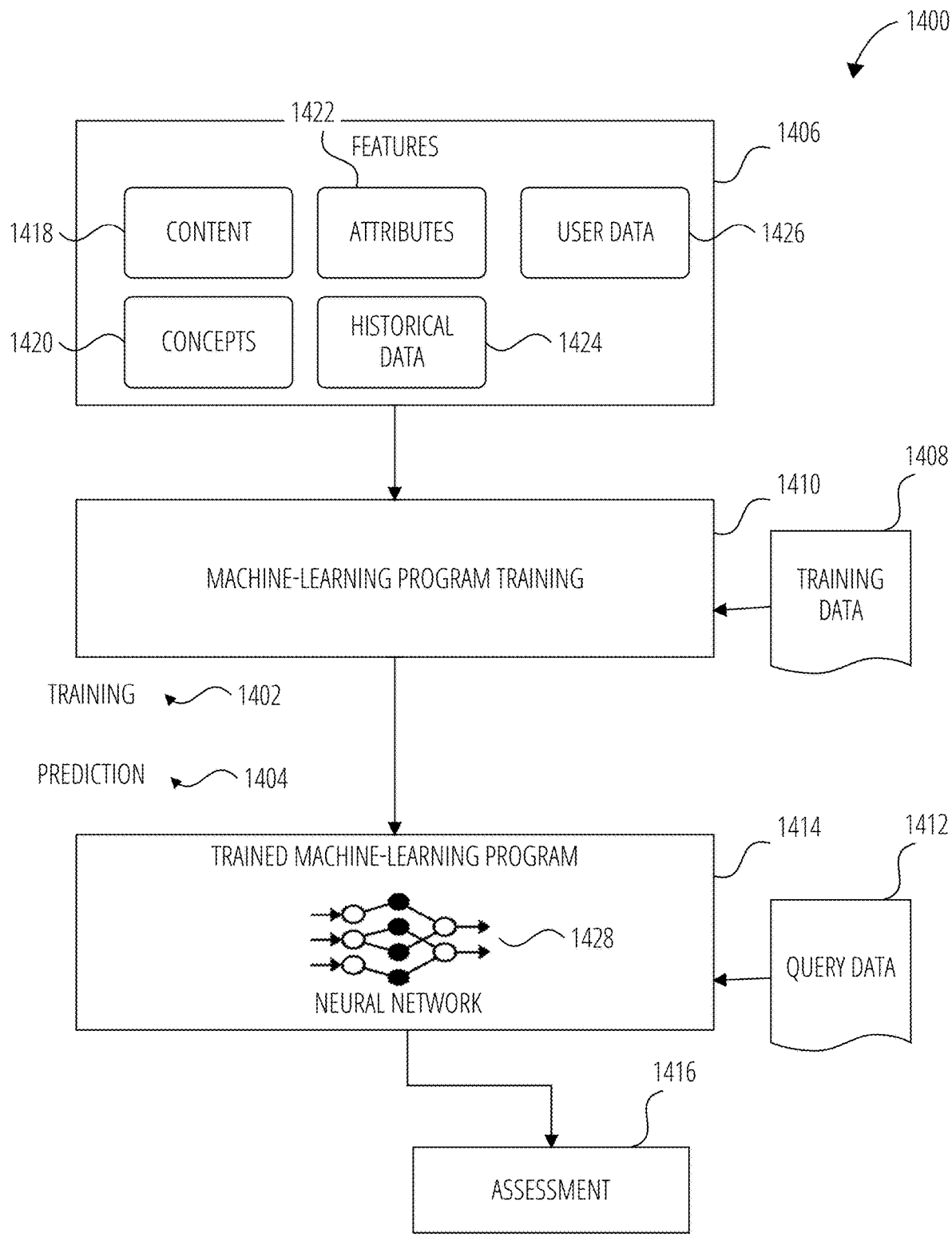
FIG. 14 is a block diagram showing a machine-learning program, according to some embodiments.

FIG. 14 depicts a machine-learning program, showing the training and prediction phases, the types of data and features involved, and the structure of a neural network used for processing.

FIG. 1 is a network diagram depicting a system 100 within which various example embodiments may be deployed (such as a stream enrichment system 202, as illustrated in FIG. 2). A networked system 122 in the example form of a cloud computing service, such as Microsoft Azure or other cloud service, provides server-side functionality, via a network 118 (e.g., the Internet or Wide Area Network (WAN)) to one or more endpoints (e.g., client machine(s) 108). FIG. 1 illustrates client application(s) 110 on the client machine(s) 108. Examples of client application(s) 110 may include a web browser application, such as the Internet Explorer browser developed by Microsoft Corporation of Redmond, Washington or other applications supported by an operating system of the device, such as applications supported by Windows, iOS or Android operating systems. Examples of such applications include e-mail client applications executing natively on the device, such as an Apple Mail client application executing on an iOS device, a Microsoft Outlook client application executing on a Microsoft Windows device, or a Gmail client application executing on an Android device. Examples of other such applications may include calendar applications, file sharing applications, and contact center applications. Each of the client application(s) 110 may include a software application module (e.g., a plug-in, add-in, or macro) that adds a specific service or feature to the application.

An API server 120 and a web server 126 are coupled to, and provide programmatic and web interfaces respectively to, one or more software services, which may be hosted on a software-as-a-service (SaaS) layer or platform 102. The SaaS platform may be part of a service-oriented architecture, being stacked upon a platform-as-a-service (PaaS) layer 104 which, may be, in turn, stacked upon a infrastructure-as-a-service (IaaS) layer 106 (e.g., in accordance with standards defined by the National Institute of Standards and Technology (NIST)).

While the applications (e.g., service(s)) 112 are shown in FIG. 1 to form part of the networked system 122, in alternative embodiments, the applications 110 may form part of a service that is separate and distinct from the networked system 122.

Further, while the system 100 shown in FIG. 1 employs a cloud-based architecture, various embodiments are, of course, not limited to such an architecture, and could equally well find application in a client-server, distributed, or peer-to-peer system, for example. The various server applications 112 could also be implemented as standalone software programs. Additionally, although FIG. 1 depicts machines 108 as being coupled to a single networked system 122, it will be readily apparent to one skilled in the art that client machine(s) 108, as well as client applications 110, may be coupled to multiple networked systems, such as payment applications associated with multiple payment processors or acquiring banks (e.g., PayPal, Visa, MasterCard, and American Express).

Web applications executing on the client machine(s) 108 may access the various applications 112 via the web interface supported by the web server 126. Similarly, native applications executing on the client machine(s) 108 may access the various services and functions provided by the applications 112 via the programmatic interface provided by the API server 120. For example, the third-party applications may, utilizing information retrieved from the networked system 122, support one or more features or functions on a website hosted by the third party. The third-party website may, for example, provide one or more promotional, marketplace or payment functions that are integrated into or supported by relevant applications of the networked system 122.

The server applications 112 may be hosted on dedicated or shared server machines (not shown) that are communicatively coupled to enable communications between server machines. The server applications 112 themselves are communicatively coupled (e.g., via appropriate interfaces) to each other and to various data sources, so as to allow information to be passed between the server applications 112 and so as to allow the server applications 112 to share and access common data. The server applications 112 may furthermore access one or more databases 124 via the database servers 114. In example embodiments, various data items are stored in the databases 124, such as the system's data items 128. In example embodiments, the system's data items may be any of the data items described herein.

Navigation of the networked system 122 may be facilitated by one or more navigation applications. For example, a search application (as an example of a navigation application) may enable keyword searches of data items included in the one or more databases 124 associated with the networked system 122. A client application may allow users to access the system's data 128 (e.g., via one or more client applications). Various other navigation applications may be provided to supplement the search and browsing applications.

FIG. 2 is a diagrammatic representation 200 of a stream enrichment system 202, according to some embodiments. The stream enrichment system 202 takes as input an event stream 208 and generates an enrichment event stream that is consumed by downstream destinations, such as destination 214. The stream enrichment system 202 includes components such as an ingest pipeline 204 and/or an enrichment pipeline 206. The ingest pipeline 204 loads data from a customer data warehouse (DWH) 210 into a high-performance cache 212 (see, e.g., FIG. 3, for more details about the ingest process). In some embodiments, the high-performance cache 212 is implemented using an Amazon DynamoDB (see, e.g., Entities DB 322) that represents a database storing entity data for fast eventual access by the enrichment pipeline 206.

In some embodiments, the data warehouse 210 is part of the ingest pipeline 204, whereas in alternative embodiments the ingest pipeline 204 takes input from the data warehouse 210. The enrichment pipeline 206 uses the data from the cache 212 to enrich the incoming stream in near real-time, with the enriched data stream being provided to downstream components or target destinations such as destination 512 (see, e.g., at least FIG. 5 for a description of the enrichment process).

While the ingest pipeline 204 and enrichment pipeline 206 are depicted as separate in FIG. 2, they can share, in some embodiments, partial functionality and/or components (see, e.g., the components used for the ingest process in FIG. 3 and for the enrichment process in FIG. 5).

In some embodiments, one or more of the components and modules of the stream enrichment system 202 belong to a data plane 748, while others belong to a control plane 744 (see, e.g., FIG. 7). The data plane 748 refers to the components that process and route customer event data, such as real-time data pipelines that transform and analyze data streams: data processing engine(s) and infrastructure in the enrichment pipeline 206 that helps enrich an incoming data stream (e.g., components such as centrifuge 726 and equivalent), a high-speed cache (e.g., cache 212) as implemented for example by one or more databases, and so forth. The control plane 744 includes components that control or set policies, settings, configurations, and/or metadata that control the behavior of the data plane. The control plane 744 can provide enrichment configurations that specify how enrichments are performed in the data plane 748. The control plane 744 can include APIs, databases, and/or UIs enabled to create the configurations (e.g., the enrichment configurations, etc.) consumed by the data plane components.

FIG. 3 is a diagrammatic representation 300 of a view of ingest pipeline 204, according to some embodiments. The ingest pipeline 204 ingests data from a customer data warehouse (DWH) 302 (e.g., corresponding to the data warehouse 210 in FIG. 2). The customer DWH 302 can be an existing Snowflake, Redshift or BigQuery data warehouse, among other options. In some embodiments, the customer DWH 302 is part of a control plane 744 of the stream enrichment system 202. Ingesting data can correspond to automatically and/or periodically synchronizing customer DWH 302 data with one or more services and components of the stream enrichment system 202, for example by transmitting new/updated/deleted data according to an ingest and/or sync schedule. In some embodiments, the ingest and/or sync schedule is a default schedule, while in others the stream enrichment system 202 receives and integrates this information based on user input (e.g., customer-provided input). Examples of data from customer DWH 302 include entity data. For example, an entity (or entity model) can correspond to a table in the customer DWH 302. Entity data can correspond to table columns, with a primary key being determined, in some embodiments, based on received user input. In some embodiments, an entity group can correspond to a container for entity models (e.g., a 1-to-1 container, etc.). The ingest pipeline 204 creates entity models and/or entity groups using a connection to customer DWH 302 (see, e.g., FIG. 4 for details).

In some embodiments, the ingest pipeline 204 uses a reverse extract-transform-load infrastructure (see, e.g., the reverse ETL 324 component). In some embodiments, the ingest pipeline 204 can reuse and/or augment an existing such infrastructure for increased efficiency and portability. The scheduler 304 performs reads from a control store (e.g., control store 314) to retrieve control data consisting of necessary entity data fields and/or values, such as for example an entity_ID field. In some embodiments, the entity_ID field, corresponding value(s), and other such entity data are required by methods of an API that writes customer DWH 302 data to a cache 212. The cache 212 can be implemented using an Amazon DynamoDB—for example, cache 212 can correspond to Entities DB 322, a database that stores entity data for fast later access by the enrichment pipeline 206. In some embodiments, the control store 314 is associated with, communicates with, ingests information from and/or writes information to a control DB (see, e.g., control DB 728, control DB 806, and so forth).

In some embodiments, the ingest pipeline 204 synchronizes a control store 314 table used by scheduler 304 to determine when a reverse ETL job (see, e.g., a job associated with a reverse ETL model as in 1004, etc.) is part of a ingest task. This information is transmitted to the extractor 306 and/or to the loader 308 component that corresponds to a reverse ETL load-worker component. The extractor 306 extracts data from the customer DWH 302. The loader 308 component creates jobs for a data processing engine implemented, in some embodiments, by the centrifuge 312 component. In some embodiments, upon receiving information related to an ingest task (see above) from scheduler 304, loader 308 creates a HTTP node corresponding to a job for centrifuge 312. The HTTP centrifuge 312 job is associated with an API endpoint, with the API representing an interface to cache 212 (e.g., Entities DB 322). In some embodiments, the API corresponds to an entities API and/or an associated URL. The API provides endpoints and/or methods for the ingest pipeline 204 to write data, retrieve data and/or delete data from Entities DB 322 (see, e.g., decision block 316 and components 318 and 320). As noted above, the Entities DB 322 API can require entity_ID field information.

In some embodiments, the loader 308's creation of a HTTP centrifuge 312 job with an API endpoint includes defining a destination (e.g., an action destination), and/or sending the HTTP centrifuge 312 job to the defined destination. The approach described herein is safe and extendable, as the API URL is internally specified and/or configured, mitigating the risk of accidental exposure of job-related data. Furthermore, the architecture illustrated in FIG. 3 allows for fast loading of customer DWH 302 data to the cache (e.g., to entities DB 322) via the API.

In some alternative embodiments, the ingest pipeline 204 and/or the enrichment pipeline 206 can use a plug-in (e.g., an Amazon DynamoDB plug-in) to ingest data from customer DWH 302 and/or enrich an incoming data stream such as an event stream 208 (or equivalent). Using a direct plug-in model rather than an API can help if the structure of the enrichment process is established and/or stable, or if no changes to the critical components of a data plane 748 are anticipated. On the other hand, using an API rather than a plug-in can more easily accommodate future requirement changes to the stream enrichment process, and/or require less modification of data plane 748 components.

In some embodiments, data sources (such as customer DWH 302) have a feature flag set or enabled. The feature flag can be associated with a prespecified source ID and/or prespecified entity model ID. The loader 308 can directly check the feature flag value in order to retrieve the necessary entity model ID. In some embodiments, the ingest pipeline 204 can kick off the synchronization of the customer DWH 302 data with the cache 212 (e.g., with the Entities DB 322) by using dual writes to write a configuration to reverse ETL 324 tables.

The high-performance cache 212 corresponding, in FIG. 3, to Entities DB 322, can be part of a data plane 748 and/or store data (e.g., entities) for low latency lookup by the enrichment pipeline 206. As previously mentioned, Entities DB 322 can be an Amazon Dynamo DB. The high-performance cache 212 can use additional or alternative key-value database options. In some embodiments, the cache 212 uses a relational database (RDS) option (e.g., if use cases require performing internal SQL operations such as joining two customer data tables from the customer DWH 302, and so forth).

FIG. 4 is a diagrammatic representation 400 of a data model used by a stream enrichment system 202 that utilizes a reverse ETL 324 architecture, according to some embodiments. The data model includes a set of tables with prespecified schemas (e.g., including primary key (PK) and foreign key (FK) information), where the relationships between the relevant concepts detailed below correspond to mappings involving primary keys and foreign keys (as illustrated).

The stream enrichment system 202 creates entity groups, consisting of entities (see, e.g., the Entity_Groups and Entity tables, including primary keys (PK) and foreign keys (FK)). The stream enrichment system 202 creates a reverse ETL 324 source (e.g., entities-source-<entity group name>). The stream enrichment system 202 creates at least one reverse ETL 324 destination (e.g., a CDP destination, entities-destination-<entity group name>).The stream enrichment system 202 creates at least one reverse ETL 324 model associated with an entity and/or entity group (e.g., entities-model-<entity name>—for representation details, see at least the Reverse_ETL_Models and Entities tables, together with the corresponding key relationships). The reverse ETL 324 model is also associated with a data source ID, a schedule (e.g., a sync schedule), one or more queries and/or corresponding query_ID_columns, and so forth. Furthermore, the stream enrichment system 202 creates a mapping that links the reverse ETL 324 model and the destination (e.g., entities-mapping-<entity name>). In some embodiments, the mapping between the reverse ETL 324 model and the destination is represented via the key-level relationships among the Reverse_ETL_Models, Reverse_ETL_Model_Subs, and a set of Destination tables. Destination tables includes Destination_Def_Actions (defining one or more actions), Destination_Config and/or Destination_Config_Subs (corresponding to configuration details, such as for example for actions and/or model subscriptions associated with the destination). As further detailed in at least FIG. 6 or FIG. 9, such a data model supports the stream enrichment system 202's creation of mappings between defined enrichment operations and/or specified entity enrichment data on one side and one or more specific destinations on another. Destinations are thus configured to receive data streams enriched with entity data available in a specified data source and associated with a specified reverse ETL model (e.g, the reverse ETL 324 model).

The reverse ETL 324 model is associated with a SQL query, such as:

SELECT COLUMN$_1$, COLUMN$_2$, ... COLUMN$_x$
  FROM SCHEMA$_1$.TABLE1;

where, for example, TABLE1 corresponds to a source table associated with a corresponding entity (or entity model) associated with the reverse ETL 324 model. The column IDs are illustrated, for example, by the "Query_ID_Column" field(s) in the Reverse_ETL_Models table. The SQL query can be stored as "Query" in the same table. In some embodiments, the SELECT operator applies to an entire object, such as the entire table corresponding to an entity. In some embodiments, the columns correspond to entity data to be used for enrichment of a data stream.

Given the aforementioned data model schema, the stream enrichment system 202 can update the reverse ETL 324 model accordingly once an entity model update has taken place. For example, if a defined enrichment operation and/or destination configuration is updated to specify a different entity model should be used for enriching an incoming data stream, the reverse ETL 324 model can be updated accordingly, so that the correct entity data is retrieved from the customer data warehouse (e.g., data source). In some embodiments, the entity used for enrichment remains the same, but the schema of the source entity table(s) changes. In such a case, a reverse ETL 324 model associated with a SQL query such as the one above does not have to be updated when the SELECT operator applies to the entire entity object (e.g., entity table).

Once the reverse ETL 324 model and/or mapping between the reverse ETL 324 model (e.g., associated with an entity or entity model) and the destination are created, the stream enrichment system 202 enables them. In some embodiments, these created resources are displayed in a user interface (UI). Upon receiving user input indicative of a sync failure, and/or a definition or revision associated with an ingest schedule, the stream enrichment system 202 can update the created resources accordingly.

FIG. 5 is a diagrammatic representation 500 of a view of the enrichment pipeline 206, according to some embodiments. Given a data stream (e.g., an event stream), the enrichment pipeline 206 retrieves enrichment configuration information from a control store 516 component (e.g., via the integrations consumer component 504). Using this enrichment configuration information, the enrichment pipeline augments or enriches the received data stream or event stream by appending to it, in real-time or near real-time, customer data available in a cache 212 (e.g., corresponding here to the Entities DB 520).

The entity enrichment pipeline 206 uses a data processing engine (see, e.g., the centrifuge 506 component) that implements data processing pipelines by assembling sets of data transformation steps into execution graphs. The centrifuge 506 component thus enables the transformation of customer data streams (e.g., event streams), and/or routes the customer data streams to one or more destinations. In some embodiments, the enrichment pipeline 206 modifies and/or augments the centrifuge 506 component (or another implementation of the data processing engine) as described in the following. Given a destination (e.g., an action destination) configured to receive enriched data corresponding, for example, to event streams enriched with entity data, the enrichment pipeline 206 adds an additional execution graph node to the execution plan for centrifuge 506. The added execution graph node performs a call to an enrichment endpoint for the API of the high-performance cache 212. For example, the enrichment endpoint call can correspond to Entities_API/Enrich 518, associated with Entities DB 520.

In some embodiments, Entities_API/Enrich 518 determines that an incoming sample or data point in the data stream (e.g., an event in an event stream) includes a data object mention (e.g., an object ID, an entity ID, etc.) at a particular stream location. In some embodiments, Entities_API/Enrich 518 determines that the data object mention at the particular stream location matches an object or entity stored in the high-performance cache 212 (e.g., represented here by Entities DB 520). For example, a detected object ID or entity ID can correspond to or match an object ID or entity ID stored in the high-performance cache 212. In some embodiments, Entities_API/Enrich 518 uses a specification of a path or location (e.g., a fixed location) into the data stream point or sample (e.g., event) to be used for attempting to determine such a match (see, e.g., target_match_path in the FIG. 8 description). In some embodiments, the specified path or location depends on the type of the data stream point or sample (e.g., on the type of event for an event stream). In some embodiments, the specified path or location is indicated by a rule (e.g, a target match path rule).

If a matching stored data object (e.g., object ID, entity ID, etc.) is identified for a data object mention at a particular stream location, Entities_API/Enrich 518 enriches the data stream or event stream by appending, at the particular stream location, enrichment data available in Entities DB 520 for the relevant object or entity, as described below. In some embodiments, the enrichment data consists of an object ID or entity ID corresponding to an entity and/or a set of entity attribute values (e.g., _cdp_entities.[entityID]: {field$_1$: value$_1$, field$_2$:value$_2$,field$_n$: value$_n$}. Examples of attribute values for a product entity associated with a product ID can include values for description, price, and so forth (in addition to the value of the product ID attribute itself). Examples of attribute values for a user can correspond to the values for user name, user phone number and/or address (in addition to a value for a user ID attribute). By appending such additional attributes and/or attribute values for a detected entity ID or object ID, the stream enrichment system 202 enriches the incoming data stream or event stream with customer DWH data. The match between an object or entity detected at a particular location in the data stream and a corresponding object or entity in Entities DB 520 can use primary key (PK) information (e.g., the object ID or entity ID field). In some embodiments, the match can use fields in addition to the primary key, as described below. Furthermore, the match can use a matching criterion such as exact match, approximate match (e.g., exact or approximate string match), semantic match, or another pre-specified matching criterion.

In some embodiments, the stream enrichment system 202 has an associated UI and/or an associated API that can receive user input and/or user commands and/or automatically use them to configure a match between a data stream sample and enrichment data stored, for example, in the Entities DB 520 or another storage corresponding to the high-performance cache 212. In some embodiments, the match configuration can include a specification of a path or location (e.g., a fixed location) into the data stream point or sample (e.g., event) to be used for a match (see, e.g., target_match_path in the FIG. 8 description). In some embodiments, the specified path or location depends on the type of the data stream point or sample (e.g., on the type of event for an event stream). As described in at least FIG. 6 and/or FIG. 8, the match configuration can include a specification of an entity (or entity type or entity class) to match on, and/or one or more entity table column or field to be used for the matching. In some embodiments, the match configuration can include entity attributes to be used for enrichment, or, alternatively, entity attributes to be omitted from the enrichment step in the context of a particular entity (or entity table).

In some embodiments, once the data stream sample and/or point has been enriched, the enriched data stream sample (e.g., entities result 508) is delivered to a service component (e.g., integrations monoservice 510) that maps the enriched data stream sample onto a payload and/or configuration of a downstream destination. In some embodiments, the stream enrichment system 202 uses one or more destination-associated mappings between an enriched data stream sample and the destination configuration and/or payload. The destination-associated mappings can be created and/or updated by the stream enrichment system 202 based on user input and/or user commands elicited and/or received from a user (e.g., a retailer, a marketer, and so forth) via a UI and/or an API.

FIG. 6 is a diagrammatic representation 600 of part of a stream enrichment system 202 UI, according to some embodiments. Given a preexisting list of entities or entity types or classes (e.g., from a customer DWH), the stream enrichment system 202 displays the list in the UI and/or receives a user selection of an entity or entity type from the list (e.g., here, a selection of Pets from a list including Cars, Pets and Videos). The user selection corresponds to the entity or entity type whose information will be used by the stream enrichment system 202 to augment or modify an incoming data stream. Given a selected entity or entity type, the stream enrichment system 202 configures a match between the stored entity data and the incoming data stream. In some embodiments, the stream enrichment system 202 identifies a primary key (PK) of the entity table and/or presents it to the user as the only column to be used for matching between the stored entity data and the data stream. For example, for a Pets or Pet entity table, the stream enrichment system 202 enables the user to solely select Pet_ID (the primary key of the entity table) as a potential column on which to match. In some embodiments (not shown), the stream enrichment system 202 presents to the user, for selection, additional keys to be used for a match, such as for example a secondary key, a composite key, and so forth. The stream enrichment system 202 automatically integrates user-provided selections of one or more such keys to be used for a match into the match configuration. In some examples, the stream enrichment system 202 enables the user to select a property in the incoming data stream and/or in an incoming event payload for which a match should be attempted against the one or more columns or keys selected for matching (e.g., against Pet_ID, etc.). An example of such a property is Properties.X in FIG. 6 (e.g., corresponding to a key, field, ID, pattern or template used to indicate or generate a key, field, or ID, etc.). The resulting configuration for a match between the stored entity data and the data stream can be stored via a match rule (see, e.g., target_match_path in FIG. 8).

In one illustrative example, an event in an event stream can correspond to: {"type": "track", "event": "Product viewed", Properties": {"userId": "user_213", "productId": "xyz", "time": "timestamp"}}. An enriched or augmented version of the event, sent to a destination, can correspond to:

{"type": "track", "event": "Product viewed", "Properties": {"userId": "user_213", "productId": "xyz", "time": "timestamp" }, "enrichments": {"productName": "house plant" }}. Here, the stream enrichment system 202 will have used, for example, a match rule indicating that values of the event property "productId" should be matched against values of the selected productID column in a Product table that specifies the product names for each product ID and/or the columns of the Product table should be used as enrichment data.

In some embodiments, the stream enrichment system 202 can enrich an event or data sample in an incoming data stream with entity data from multiple entity models. For example, a "Game Video Watched" event can be enriched with data from a "Game Details" entity model as well as data from a "League Pass Product" model. In some embodiments, the stream enrichment system 202 can use multiple Enrichments tables and/or multiple entity models to accomplish such enrichment scenarios.

As described at least in FIG. 5, FIG. 8 or FIG. 9, the enrichment pipeline 206 of the stream enrichment system 202 enriches the incoming data stream based on such match configuration information that specifies an entity (or entity type or entity class) to match on and/or an entity table column or field to be used for the matching.

FIG. 7 is a diagrammatic representation 700 of a view of stream enrichment system 202, according to some embodiments. As previously described, stream enrichment system 202 enriches an incoming data stream (e.g., event stream) in real time or near real time with customer DWH data, such as entity data.

In some embodiments, stream enrichment system 202 has a set of modules and/or components that belong to a control plane 744. The control plane 744 manages configuration and/or settings for enrichment operations and/or for associated customer DWH data including, for example, entities from customer DWH 740. As further detailed in FIG. 8, the control plane 744 includes a control DB (here, control DB 728) with tables that support, enable or help implement: a) relationships between enrichment configuration data and/or customer DWH configuration data and/or sync service 912 (not shown); b) relationships between enrichment configuration data and/or customer DWH configuration data and entities service 736; and/or c) relationships between the enrichment configuration data and/or customer DWH configuration data and integrations consumer component 722 and/or the data processing engine (e.g., centrifuge 726). In some embodiments, customer DWH configuration data is associated with customer DWH 740. In some embodiments, the control plane 744 components receive input from a UI and/or API associated with an app 702 component (e.g., user or customer input, etc.). The received input from app 702 can include enrichment information, mapping configuration information associated with a destination, entity model and/or data graph information. The received one or more inputs are upserted (see, e.g., components 704 through 710) to appropriate schemas and/or representations (see, e.g., 712 through 718) that are stored, maintained and/or updated as part of one or more storage locations (for example, as part of a control DB 728).

In some embodiments, the stream enrichment system 202 has a set of modules and components that belong to a data plane 748. The data plane 748 is responsible for connecting defined enrichment operations and/or enrichment data (e.g., entities) to an existing data streaming pipeline, such as an event streaming pipeline (see, e.g., FIG. 5). In some embodiments, entities service 736 functions as a primary store of record for entities and/or as a matching module that performs the actual enrichment operation and/or enrichment data injection into the incoming data stream (see, e.g., FIG. 5). In some embodiments, the functionality of the entities service 736 is enabled and/or available via an Entities API (see, e.g., at least FIG. 3 and FIG. 5). In some embodiments, the data loader 738 is a service or sub-module of existing services that synchronizes data from the customer DWH 740 with the entities service 736 (e.g., data loader 738 can correspond to loader 308 in the ingest pipeline 204 exemplified at least in FIG. 3, etc.).

FIG. 8 is a diagrammatic representation 800 of a control DB 806 used by a stream enrichment system 202, according to some embodiments. As indicated in FIG. 7, the control plane 744 of stream enrichment system 202 can include or be associated with a control DB (e.g., control DB 728, or control DB 806, etc.) containing a set of tables used to support or enable choices related to operations of the stream enrichment system 202.

In some embodiments, control DB 806 includes an Entities table (e.g., corresponding to, or referred to as an entity model). The Entities table can have multiple uses. For example, for a given or selected entity (see, e.g., FIG. 6), the Entities table can denote a key (e.g., a primary key) that will be used for matching entity data with the data stream as part of the data stream enrichment process. In some embodiments, the Entities table can enable the stream enrichment system 202 to create an example enrichment payload to be used during an initial mapping setup (e.g., a setup by a user via a UI). In some embodiments, the Entities table can help the stream enrichment system 202 to automatically identify differentiating changes in the context of schema changes, and so forth.

TABLE 1

Entities table

| Column | Description |
| --- | --- |
| ID | entity ID |
| entity_group_ID | Reference to parent group ID |
| name | String corresponding to entity display name |
| table | String corresponding to table name (e.g., entity table name) in the customer data warehouse |
| slug | |
| description | String corresponding to a user accessible description of table |
| sync_interval | Timestamp representing a requested refresh interval for a current enrichment. Service queries matching entity names and take the minimum value. |
| schema | JSON spec for the table that contains the primary key (PK) along with column names and types. Example:<br>{ "schema":"v0.0.1",<br>  "primaryKey": {  "id": "string"  },<br>  "columns": {  "name": "string",<br>    "count": "int",<br>    "created_at": "timestamp",<br>    "updated_at": "timestamp" }} |
| updated_at | Timestamp |
| created_at | Timestamp |
| schema_version | A number marking the schema version |
| schema_updated_at | Timestamp |

In some embodiments, control DB 806 includes an Entity Group table, where an entity group corresponds to a one-to-one container for entity models.

TABLE 2

Entity Group

| Column | Description |
| --- | --- |
| ID | entity group ID |
| Name | String, user accessible name of entity group (or graph) |
| Description | String, user accessible name of entity group (or graph) |
| updated_at | Timestamp |
| created_at | Timestamp |

In some embodiments, the control DB 806 includes an Entity Group Settings table (or Entity Group Warehouse Settings table). In some embodiments, the Entity Group Settings table is a general purpose store for authentication and/or access settings related to customer data warehouse connections (e.g., customer DWH 302 connections). The Entity Group Settings table is accessible to a data sync service 912 (see, e.g., FIG. 9).

TABLE 4

Entity Group Settings

| Column | Description |
| --- | --- |
| entity_group_ID | Foreign key (FK) to Entity Group table |
| setting_name | Key for setting name (generic) |
| value | Value of the setting |
| updated_at | Timestamp |

In some embodiments, the control DB 806 includes an Enrichments table that serves as a container for user settings related to enrichment operations. In some embodiments, there is a 1-to-1 relationship between the enrichment configuration and destination (action destination) subscriptions. In some embodiments, the Enrichments table enables additional types of enrichments: flexible target-type enrichments (e.g., source and/or insert-level enrichments), multiple enrichments configured per subscription (e.g., stream enrichment with data from multiple entity tables), many-to-one action subscriptions, destination-level enrichments (e.g., enrichments that take place at a particular pre-specified destination), and so forth.

As seen below, the Enrichments table can include enrichment config ID information, information about target data types (e.g., data types to be targeted for enrichment), information about entities to be used for enrichment (e.g., entity ID), and so forth. For example, the Enrichments table can include an entry corresponding to a configured enrichment operation, target_match_path. target_match_path can correspond to a path directive that defines a path within an incoming event (e.g., a CDP event) to attempt to match to a field associated with an entity or entity type. Given an incoming CDP event (e.g., event payload) or data sample, the path can indicate or correspond to a key and/or field definition (e.g., an object ID or entity ID, etc.), a pattern to be used for detecting a key or field, and so forth.

TABLE 1

Enrichments table

| Column[1] | Description |
| --- | --- |
| ID | enrichment config ID |
| target_ID | ID of target 'type' (e.g., action subscription ID) |
| target_type | String representing a target data type to which to connect an entity.<br>default (non-exclusive): 'action_subscription' |

TABLE 1-continued

Enrichments table

| Column[1] | Description |
| --- | --- |
| entity_ID | ID corresponding to a reference to the entity to enrich with (e.g., enrichment entity) |
| target_match_path | A JSON object containing a path directive = [e.g., key in a CDP event payload on which to attempt to match an enrichment entity] |
| entity_columns | A JSON array representing 'chosen' columns from the mapping definitions. This field can be used, for example, by data loader 738 to determine user-selected fields/columns for the enrichment entity. |
| parent_resource_ID | The destination ID of the parent destination 'type.' |
| parent_resource_type | A type: destination_definition |
| created_at | Time stamp |
| updated_at | Time stamp |

FIG. 9 is a diagrammatic representation 900 of control plane data flows in stream enrichment system 202, according to some embodiments.

In some embodiments, a data flow includes a communication between app 914 and a control plane service (CPS) (here illustrated, for example, by one or more of components 902 through 908 or 910). The data flow includes processed user input received via a UI or API associated with app 914, where the user input informs the configuration of the enrichment process. The stream enrichment system 202 uses the received user input to update configuration information such as credentials and setup for a customer DWH, a sync schedule associated with loading data from the customer DWH, a path for the enrichment setup data (e.g., in an actions UI), and so forth. Here, the path for the enrichment setup data can correspond to a path within the incoming data stream (e.g., event stream), indicating, for example, a key in an event payload on which a match should be attempted against one or more fields or columns associated with a stored enrichment entity.

In some embodiments, a data flow includes one or more communications between a sync service 912 and one or more components of the control plane service (CPS) (e.g., illustrated by one or more of components 902 through 908 or 910). Such communications can be bidirectional. In some embodiments, the sync service 912 is a dedicated service that synchronizes and/or performs loads from a customer data warehouse (e.g., customer DWH 302, customer DWH 740, etc.) to entities service 910. As illustrated at least in FIG. 3, the stream enrichment system 202 can use an existing reverse ETL infrastructure to perform the loads from a customer data warehouse (e.g., customer DWH 740) to entities service 910 (e.g., the sync service 912 can correspond to one or more components of the ingest pipeline 204, etc.) In some embodiments, the stream enrichment system 202 first sets up a new customer DWH connection via a UI (e.g., an Entities UI). The stream enrichment system 202 uses one or more APIs of the CPS (e.g., here, a reverse ETL CPS) to register the customer DWH (e.g., customer DWH 740) as a new data source. For example, CPS transmits customer DWH authentication information (e.g., "DWH credentials"), information about tables and columns to be synchronized and/or sync schedule details (e.g., "Entity Column Selection," "Tables," "DWH Sync Schedule"), and so forth. CPS can store an entity model with necessary configuration information (e.g., using control DB 902). In some embodiments, sync service 912 owns the connection to the customer DWH, and/or writes the customer DWH schema information to CPS (e.g., to control DB 902). The customer DWH schema information can be later displayed in a UI upon connecting to the customer DWH (e.g., to customer DWH 740). In some embodiments, the communication between sync service 912 and CPS involves a CPS control store (e.g., control store 904), associated with control DB 902 as described below.

In some embodiments, a data flow involves a communication between control DB 902 and entities service 910. Given a significant read load, this communication flow can use indirection via the integrations consumer component 906. Given an incoming event and/or incoming job (e.g., associated with part of a data stream), the integrations consumer component 906 can look up, via control store 904, a corresponding enrichment ID for the event and/or job (or whether any such corresponding enrichment ID exists). If the look-up fails, the stream enrichment system 202 assumes no enrichment operation has been configured for the incoming event and/or job. If the look-up is successful, the confirmed enrichment ID can be appended to a node (e.g., an HTTP node) used to call an enrichment endpoint of entities service 910 (see, e.g., FIG. 5 for more details). The enrichment endpoint call to entities service 910 returns an enriched payload including an enriched data stream sample (e.g., enriched event) and/or enrichment data (e.g., enrichment entity data). In some embodiments, the stream enrichment system 202 then formats the current job (e.g., the enrichment job) into a cloud event to be transmitted to an integrations service (e.g., integrations monoservice 510) for eventual transmission to a destination (e.g., 512, as seen for example in FIG. 5).

In some embodiments, the stream enrichment system 202 appends the enrichment ID to a plan node created for a plug-in (e.g., a HTTP plug-in) associated with the centrifuge 908 component. The respective plug-in enables the invocation or use of custom URL. In some alternative embodiments, the reverse ETL CPS uses a flag for data sources that have opted in to create an Amazon Dynamo DB job that is then forwarded to the centrifuge 908 data processing engine. This operation results in the creation of a custom code path that can be updated and/or replaced with a HTTP job as previously mentioned.

In some embodiments, the integrations consumer component 906 receives a config ID, a subscription ID (e.g., an action subscription ID) and/or a flow ID and performs a corresponding look-up to retrieve the enrichment data based on the relevant received ID.

In order to perform the required enrichment, the entities service 910 receives and/or accesses a list of available entity models (e.g., entities and/or entity groups) and/or an entity lookup path (e.g., taking the form of a mapping kit directive). In some embodiments, the list of available entity models and/or the entity lookup path (or enrichment path) are available in control store 904, as seen below. In some embodiments, the control store 904 is implemented using an Amazon Dynamo DB, with fields and/or values for control store 904 stored in a JSON format.

TABLE 5

| Control store | |
|---|---|
| Column | Description |
| enrichment.path | Enrichment path from an Enrichments table (corresponding, for example, to target_match_path in FIG. 8). |

TABLE 5-continued

| Control store | |
|---|---|
| Column | Description |
| subscription_ID | Subscription ID from the Enrichments table (corresponding, for example, to target_ID in FIG. 8). |
| [enrichment.columns] | List of columns to enrich on (e.g., corresponding to entity_columns in FIG. 8, etc.). |
| entity_ID | Entity ID. The entity ID can be used for the creation of an event stream insert path. |
| entity_group_ID | Entity group ID. The entity group ID can be used for the creation of an event stream insert path. |

In some embodiments, entities service 910 has an available restful HTTP interface and/or is accessible or corresponding to an Entities API.

Example Embodiments: Integrating User Input

The section herein describes examples of processing of user input, elicited or received via a system UI (or via an API) by the stream enrichment system 202.

Given a UI associated with an app 914 component, the UI can include a top-level navigation item for a "new graph" UI element (corresponding to a creation of a new data graph). Upon receiving a selection of this UI element by the user, the stream enrichment system 202 creates a data graph (e.g., an acyclic directed graph) and/or connects it to a customer DWH, with a predetermined synchronization frequency. In some embodiments, an app 914 API calls a service (e.g., a control plane service (CPS)) to add a data graph table and/or a data graph settings entry to a control store or DB (e.g., control store 516, control DB 902), the data graph table and data graph settings entry being associated with credentials for the customer DWH. The stream enrichment system 202 can create an entity model (e.g., an entity data model), corresponding to at least a table in the customer DWH. The stream enrichment system 202 can store entity model table(s) corresponding to the entity model to a control store and/or a control DB (e.g., control store 516, control DB 902, etc.). In some embodiments, the app 914 API requests that CPS add an entity model entry to the control store and/or a control DB. In some embodiments, the stream enrichment system 202 receives a user selection of a specific entity table in the customer DWH (e.g., corresponding to entity data to be used for enrichment).

In some embodiments, the stream enrichment system 202 requests a schema from the customer DWH prior to the user selection of the specific entity table. The schema corresponds to a list of available tables and/or associated data types. In some embodiments, sync service 912 determines whether the customer DWH includes at least one table. The stream enrichment system 202 can store schema data received from the customer DWH in a control DB 902 Entities table (e.g., in a JSON format). In some embodiments, each entity corresponding to a customer DWH table has its own entry in control DB 902.

In some embodiments, the stream enrichment system 202 displays an actions UI enabled to set up an action destination based on received user input. The UI includes a preexisting list of entities or entity types, eliciting a user selection of an entity or entity type, and/or user-provided input with respect to configuring an entity match rule (see, e.g., FIG. 6, for details). In some embodiments, the entity match rule corresponds to a mapping kit directive or path directive that defines a path within an incoming event (e.g., a CDP event) to attempt to match to a user-selected field associated with an entity or entity type. The path can correspond, for example, to a key and/or field in a CDP event or in an incoming data sample (e.g., a key or field specification, a key or field definition, a pattern to be used for detecting a key or field of interest, etc.). The app 914 can save the entity match rule as an entry corresponding to an enrichment operation in an Enrichments table (see, e.g., target_match_path in the FIG. 8 description, etc.)

In some embodiments, the stream enrichment system 202 can receive user input associated with creating mappings between defined enrichment operations and/or specified entity enrichment data on one side and one or more specific destinations on another side. In some embodiments, the enrichment operations are defined, using user-provided input, in the course of setting up mappings between event fields from a source to a destination. In addition to establishing mappings between source event fields and destination event fields, the stream enrichment system 202 creates and/or records mappings between entity data model fields (used for enriching an event in an event stream) and destination fields. For example, a destination field can be mapped to a entity data model field used for event stream enrichment. In some embodiments, as part of the creation of mappings between entity data model fields used for enrichment and destination fields, the stream enrichment system 202 retains only a subset of the entity data model fields (e.g., columns in an Entity table, etc.) to be used as enrichment data for the data stream or event stream. In some embodiments, the choice of such entity data model fields is performed using user-provided input.

In some embodiments, upon receiving an entity and/or entity table selection for enrichment purposes (see above), the entity table schema is retrieved, with the types exposed in the schema being transformed into example data (e.g., 'string' becomes 'example string'). As part of the stream enrichment system 202's creation of mapping paths to the new enrichment data, the transformed example data can be injected into a test event. Upon detecting that the user has completed specifying and/or updating mappings between enrichment operations and destinations, the stream enrichment system 202 saves the respective mappings. In some embodiments, a property of the Enrichments table (e.g., the entity_columns property or a column_list property) can be updated via a write operation associated with the existing control plane service (or CPS). In some embodiments, the stream enrichment system 202 filters the existing set of mappings, retaining mappings that contain an enrichment key. A determining key from those mappings (e.g., a key identifying the entities to be used) is extracted and added to the column list (e.g., the entity_columns property or column_list property, etc). The column list can then be read, for example via control store 904, by the ingest pipeline 204 flow.

FIG. 10 is a diagrammatic representation 1000 of views of partial data flows in a stream enrichment system 202.

In some embodiments, the stream enrichment system 202, via an attestation service 1010, requests and/or receives schema information from a customer DWH 1012. The received schema can be saved to a dedicated storage (see, e.g., entities/Entity_Group 1006), and used to populate a created entity group (see, the new entity group 1002) that is written to storage. The stream enrichment system 202 can define and/or enable a reverse ETL 1004 model set up to be connected to a warehouse source 1008 (in some embodiments, the warehouse source 1008 is configured based on the customer DWH 1012). More details about this partial data flow can be found at least in FIG. 3 or FIG. 9.

In some embodiments, the stream enrichment system 202 creates and stores a new entity model (see, e.g., new entity model 1016 and the 1020 storage component). The stream enrichment system 202 creates and/or enables a reverse ETL model (see, e.g., 1018 and/or 1022), together with a mapping between the reverse ETL model and a destination instance. In some embodiments, the destination instance and a corresponding destination subscription associated with the reverse ETL model are test instances (e.g., see 1024 and 1026, etc.).

In some embodiments, the stream enrichment system 202 creates a new enrichment operation and/or configuration (e.g., new enrichment 1030), as described in more detail at least in FIG. 8, FIG. 9 and so forth. The corresponding enrichment information (e.g., associated with new enrichment 1030) is subsequently stored (e.g., see Entities/Enrichment 1032). As described at least in FIG. 9, the stream enrichment system 202 creates mappings between enrichment operations and destinations (see, e.g., actions mappings 1034), that are then used to update the list of entity model fields utilized as part of enrichment operations (see, e.g., 1036 and FIG. 9 for details).

In some embodiments, the represented partial data flows illustrate dual write cases within the stream enrichment system 202 in the context of a control plane service (CPS).

FIG. 11 is a flowchart illustrating a method 1100 for a stream enrichment system 202, according to some embodiments.

At operation 1102, stream enrichment system 202 loads data from one or more customer data warehouses into a storage component using an ingest pipeline. At operation 1104, stream enrichment system 202 receives, at an enrichment pipeline, an incoming data stream. At operation 1106, stream enrichment system 202 determines, using the enrichment pipeline, an insertion point within the incoming data stream, the insertion point corresponding to a data object mention (e.g., an object ID, an entity ID, etc.). At operation 1108, stream enrichment system 202 determines, using the enrichment pipeline, enrichment data matching the data object mention, the enrichment data being available in the storage component and/or retrieved from the storage component. At operation 1110, the stream enrichment system 202 augments, using the enrichment pipeline, the incoming data stream with the enrichment data at the determined insertion point to generate an enriched data stream. At operation 1112, stream enrichment system 202 transmits the enriched data stream to one or more destinations.

FIG. 12 is a block diagram illustrating an example of a software architecture 1202 that may be installed on a machine, according to some example embodiments. FIG. 12 is merely a non-limiting example of software architecture, and it will be appreciated that many other architectures may be implemented to facilitate the functionality described herein. The software architecture 1202 may be executing on hardware such as a machine 1300 of FIG. 13 that includes, among other things, processors 1304, memory/storage 1306, and input/output I/O components 1318. A representative hardware layer 1234 is illustrated and can represent, for example, the machine 1300 of FIG. 13. The representative hardware layer 1234 comprises one or more processing units 1250 having associated executable instructions 1236. The executable instructions 1236 represent the executable instructions of the software architecture 1202. The hardware layer 1234 also includes memory or storage 1252, which also have the executable instructions 1236. The hardware layer 1234 may also comprise other hardware 1254, which represents any other hardware of the hardware layer 1234, such as the other hardware illustrated as part of the machine 1300.

In the example architecture of FIG. 12, the software architecture 1202 may be conceptualized as a stack of layers, where each layer provides particular functionality. For example, the software architecture 1202 may include layers such as an operating system 1230, libraries 1218, frameworks/middleware 1216, applications 1210, and a presentation layer 1208. Operationally, the applications 1210 or other components within the layers may invoke API calls 1258 through the software stack and receive a response, returned values, and so forth (illustrated as messages 1256) in response to the API calls 1258. The layers illustrated are representative in nature, and not all software architectures have all layers. For example, some mobile or special-purpose operating systems may not provide a frameworks/middleware 1216 layer, while others may provide such a layer. Other software architectures may include additional or different layers.

The operating system 1230 may manage hardware resources and provide common services. The operating system 1230 may include, for example, a kernel 1246, services 1248, and drivers 1232. The kernel 1246 may act as an abstraction layer between the hardware and the other software layers. For example, the kernel 1246 may be responsible for memory management, processor management (e.g., scheduling), component management, networking, security settings, and so on. The services 1248 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1218 (or 1222) may provide a common infrastructure that may be utilized by the applications 1210 and/or other components and/or layers. The libraries 1218 typically provide functionality that allows other software modules to perform tasks in an easier fashion than by interfacing directly with the underlying operating system 1230 functionality (e.g., kernel 1246, services 1248, or drivers 1232). The libraries 1218 (or 1222) may include system libraries 1224 (e.g., C standard library) that may provide functions such as memory allocation functions, string manipulation functions, mathematic functions, and the like. In addition, the libraries 1218 or 1222 may include API libraries 1226 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1218 (or 1222) may also include a wide variety of other libraries 1244 to provide many other APIs to the applications 1212 and other software components/modules.

The frameworks 1214 (also sometimes referred to as middleware) may provide a higher-level common infrastructure that may be utilized by the applications 1210 or other software components/modules. For example, the frameworks 1214 may provide various graphical user interface functions, high-level resource management, high-level location services, and so forth. The frameworks 1214 may provide a broad spectrum of other APIs that may be utilized by the applications 1210 and/or other software components/modules, some of which may be specific to a particular operating system or platform.

The applications 1210 include built-in applications 1240 and/or third-party applications 1242. Examples of representative built-in applications 1240 may include, but are not limited to, a home application, a contacts application, a browser application, a book reader application, a location application, a media application, a messaging application, or a game application.

The third-party applications 1242 may include any of the built-in applications 1240, as well as a broad assortment of other applications. In a specific example, the third-party applications 1242 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 1242 may invoke the API calls 1258 provided by the mobile operating system such as the operating system 1230 to facilitate functionality described herein.

The applications 1210 may utilize built-in operating system functions, libraries (e.g., system libraries 1224, API libraries 1226, and other libraries 1244), or frameworks/middleware 1216 to create user interfaces to interact with users of the system. Alternatively, or additionally, in some systems, interactions with a user may occur through a presentation layer, such as the presentation layer 1208. In these systems, the application/module "logic" can be separated from the aspects of the application/module that interact with the user.

Some software architectures utilize virtual machines. In the example of FIG. 12, this is illustrated by a virtual machine 1204. The virtual machine 1204 creates a software environment where applications/modules can execute as if they were executing on a hardware machine. The virtual machine 1204 is hosted by a host operating system (e.g., the operating system 1230) and typically, although not always, has a virtual machine monitor 1228, which manages the operation of the virtual machine 1204 as well as the interface with the host operating system (e.g., the operating system 1230). A software architecture executes within the virtual machine 1204, such as an operating system 1230, libraries 1218, frameworks/middleware 1216, applications 1212, or a presentation layer 1208. These layers of software architecture executing within the virtual machine 1204 can be the same as corresponding layers previously described or may be different.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314 within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322 respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

FIG. 14 is a block diagram showing a machine-learning program 1400 according to some embodiments. The machine-learning programs 1400, also referred to as machine-learning algorithms or tools, can be used as part of the stream enrichment system 202 system.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine-learning tools operate by building a model from example training data 1408 in order to make data-driven predictions or decisions expressed as outputs or assessments (e.g., assessment 1416). Although examples are presented with respect to a few machine-learning tools, the principles presented herein may be applied to other machine-learning tools.

In some embodiments, different machine-learning tools may be used. For example, Logistic Regression (LR), Naive-Bayes, Random Forest (RF), Gradient Boosted Decision Trees (GBDT), neural networks (NN), matrix factorization, and Support Vector Machines (SVM) tools may be used. In some embodiments, one or more ML paradigms may be used: binary or n-ary classification, semi-supervised learning, etc. In some embodiments, time-to-event (TTE) data will be used during model training. In some embodiments, a hierarchy or combination of models (e.g. stacking, bagging) may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning program 1400 supports two types of phases, namely a training phases 1402 and prediction phases 1404. In training phases 1402, supervised learning, unsupervised or reinforcement learning may be used. For example, the machine-learning program 1400 (1) receives features 1406 (e.g., as structured or labeled data in supervised learning) and/or (2) identifies features 1406 (e.g., unstructured or unlabeled data for unsupervised learning) in training data 1408. In prediction phases 1404, the machine-learning program 1400 uses the features 1406 for analyzing query data 1412 to generate outcomes or predictions, as examples of an assessment 1416.

In the training phase 1402, feature engineering is used to identify features 1406 and may include identifying informative, discriminating, and independent features for the effective operation of the machine-learning program 1400 in pattern recognition, classification, and regression. In some examples, the training data 1408 includes labeled data, which is known data for pre-identified features 1406 and one or more outcomes. Each of the features 1406 may be a variable or attribute, such as individual measurable property of a process, article, system, or phenomenon represented by a data set (e.g., the training data 1408). Features 1406 may also be of different types, such as numeric features, strings, and graphs, and may include one or more of content 1418, concepts 1420, attributes 1422, historical data 1424 and/or user data 1426, merely for example.

In training phases 1402, the machine-learning program 1400 uses the training data 1408 to find correlations among the features 1406 that affect a predicted outcome or assessment 1416.

With the training data 1408 and the identified features 1406, the machine-learning program 1400 is trained during the training phase 1402 at machine-learning program training 1410. The machine-learning program 1400 appraises values of the features 1406 as they correlate to the training data 1408. The result of the training is the trained machine-learning program 1414 (e.g., a trained or learned model).

Further, the training phases 1402 may involve machine learning, in which the training data 1408 is structured (e.g., labeled during preprocessing operations), and the trained machine-learning program 1414 implements a relatively simple neural network 1428 (or one of other machine learning models, as described herein) capable of performing, for example, classification and clustering operations. In other embodiments, the training phase 1402 may involve deep learning, in which the training data 1408 is unstructured, and the trained machine-learning program 1414 implements a deep neural network 1428 that is able to perform both feature extraction and classification/clustering operations.

A neural network 1428 generated during the training phase 1402, and implemented within the trained machine-learning program 1414, may include a hierarchical (e.g., layered) organization of neurons. For example, neurons (or nodes) may be arranged hierarchically into a number of layers, including an input layer, an output layer, and multiple hidden layers. The layers within the neural network 1428 can have one or many neurons, and the neurons operationally compute a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which define the influence of the input from a transmitting neuron to a receiving neuron.

In some embodiments, the neural network 1428 may also be one of a number of different types of neural networks, including a single-layer feed-forward network, an Artificial Neural Network (ANN), a Recurrent Neural Network (RNNB), a symmetrically connected neural network, and unsupervised pre-trained network, a Convolutional Neural Network (CNN), or a Recursive Neural Network (RNN), merely for example.

During prediction phases 1404 the trained machine-learning program 1414 is used to perform an assessment. Query data 1412 is provided as an input to the trained machine-learning program 1414, and the trained machine-learning program 1414 generates the assessment 1416 as output, responsive to receipt of the query data 1412.

EXAMPLE EMBODIMENTS

Embodiment 1 is a system comprising: one or more computer processors; one or more computer memories; and a set of instructions stored in the one or more computer memories, the set of instructions configuring the one or more computer processors to perform operations, the operations comprising: loading data from one or more customer data warehouses into a storage component using an ingest pipeline; receiving, at an enrichment pipeline, a data stream;

determining, by the enrichment pipeline, an insertion point within the data stream, the insertion point corresponding to a data object mention; determining, by the enrichment pipeline, enrichment data matching the data object mention, the enrichment data being retrieved from the storage component; augmenting, using the enrichment pipeline, the data stream with the enrichment data at the determined insertion point to generate an enriched data stream; and transmitting the enriched data stream to one or more destinations.

In Embodiment 2, the subject matter of Embodiment 1 includes, wherein the ingest pipeline comprises a scheduler component that determines at least one of a timing or a frequency of data synchronization operations between the one or more customer data warehouses and the storage component.

In Embodiment 3, the subject matter of Embodiment 2 includes, wherein the ingest pipeline comprises a loader component, the loader component enabled to: receive, from the scheduler component, synchronization information corresponding to a first job to be executed as part of an data ingest task; upon receiving the synchronization information associated with the first job, create a second job for a data processing engine based on the first job, the second job being associated with an application programming interface (API) to the storage component; and execute the second job, the executing of the second job comprising one of at least a data write operation, data retrieval or data deletion operation associated with the storage component.

In Embodiment 4, the subject matter of Embodiment 1-3 includes, wherein: the enrichment pipeline uses a data processing engine associated with an execution plan; and upon receiving an incoming data stream and detecting that a downstream component is configured to receive an enriched data stream, adding an execution graph node to the execution plan for the data processing engine, the execution graph node associated with a call to an enrichment endpoint for an API to the storage component.

In Embodiment 5, the subject matter of Embodiment 4 includes, wherein: the data object mention corresponds to an entity ID; and determining the insertion point within the incoming data stream comprises detecting the entity ID in the incoming data stream using a path rule and the enrichment endpoint for the API associated with the storage component.

In Embodiment 6, the subject matter of Embodiment 5 includes, wherein: the enrichment data comprises one or more entity attributes, each entity attribute associated with at least one attribute value; the enrichment data matching the data object mention comprises an entity attribute of the one or more entity attributes matching the entity ID based on a matching criterion; and the enrichment data is retrieved from the storage component using the API.

In Embodiment 7, the subject matter of Embodiments 1-6 includes, wherein the data stream corresponds to an event stream and the storage component corresponds to a cache component.

In Embodiment 8, the subject matter of Embodiments 1-7 includes, the operations further comprising: creating a source corresponding to a table in a customer data warehouse, the source associated with an entity model; creating a destination to receive the enriched data stream; and creating a reverse extract-transform-load (ETL) model associated with the entity model and the source, the reverse ETL model comprising: a relational query comprising column information or table information for the table corresponding to the source in the customer data warehouse; and synchronization schedule information associated with the table corresponding to the source in the customer data warehouse.

In Embodiment 9, the subject matter of Embodiment 8 includes, wherein the relational query comprises table information and forgoes column information, and wherein, upon detecting an update to a schema of the table associated with the source, the reverse ETL model remains unchanged.

In Embodiment 10, the subject matter of Embodiments 8-9 includes, the operations further comprising creating a mapping between the reverse ETL model and the destination.

In Embodiment 11, the subject matter of Embodiment 10 includes, the operations further comprising displaying one of at least the reverse ETL model, the entity model and the mapping between the reverse ETL model and the destination in a user interface (UI); upon receiving user input indicative of a synchronization failure associated with the source or of a revision to the synchronization schedule information, updating the reverse ETL model; and upon receiving user input indicative of a revision to the mapping between the reverse ETL model and the destination, updating the mapping.

Embodiment 12 is at least one non-transitory machine-readable medium (or computer-readable medium) including instructions that, when executed by processing circuitry, cause the processing circuitry to perform operations to implement any of Embodiments 1-11.

Embodiment 13 is an apparatus comprising means to implement any of Embodiments 1-11.

Embodiment 14 is a method to implement any of Embodiments 1-11.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A system comprising:
one or more computer processors;
one or more computer memories; and
a set of instructions stored in the one or more computer memories, the set of instructions configuring the one or more computer processors to perform operations, the operations comprising:
loading data from one or more customer data warehouses into a storage component using an ingest pipeline, the loading of the data comprising:
creating a source corresponding to a table in a customer data warehouse of the one or more customer data warehouses; and
creating a reverse extract-transform-load (ETL) model associated with the source, the reverse ETL model comprising a relational query comprising table information for the table, the reverse ETL model remaining unchanged upon detecting an update to a schema of the table;
receiving, at an enrichment pipeline, a data stream;
determining, by the enrichment pipeline, an insertion point within the data stream, the insertion point corresponding to a data object mention;
determining, by the enrichment pipeline, enrichment data matching the data object mention, the enrichment data being retrieved from the storage component;
augmenting, using the enrichment pipeline, the data stream with the enrichment data at the determined insertion point to generate an enriched data stream; and
transmitting the enriched data stream to one or more destinations.

2. The system of claim 1, wherein the ingest pipeline comprises a scheduler component that determines at least one of a timing or a frequency of data synchronization operations between the one or more customer data warehouses and the storage component.

3. The system of claim 2, wherein the ingest pipeline comprises a loader component, the loader component enabled to:
receive, from the scheduler component, synchronization information corresponding to a first job to be executed as part of an data ingest task;
upon receiving the synchronization information associated with the first job, create a second job for a data processing engine based on the first job, the second job being associated with an application programming interface (API) to the storage component; and execute the second job, the executing of the second job comprising one of at least a data write operation, data retrieval or data deletion operation associated with the storage component.

4. The system of claim 1, wherein:
the enrichment pipeline uses a data processing engine associated with an execution plan; and
upon receiving an incoming data stream and detecting that a downstream component is configured to receive an enriched data stream, adding an execution graph node to the execution plan for the data processing engine, the execution graph node associated with a call to an enrichment endpoint for an API to the storage component.

5. The system of claim 4, wherein:
the data object mention corresponds to an entity ID; and
determining the insertion point within the incoming data stream comprises detecting the entity ID in the incoming data stream using a path rule and the enrichment endpoint for the API associated with the storage component.

6. The system of claim 5, wherein:
the enrichment data comprises one or more entity attributes, each entity attribute associated with at least one attribute value;
the enrichment data matching the data object mention comprises an entity attribute of the one or more entity attributes matching the entity ID based on a matching criterion; and
the enrichment data is retrieved from the storage component using the API.

7. The system of claim 1, wherein the data stream corresponds to an event stream and the storage component corresponds to a cache component.

8. The system of claim 1, wherein:
the source and the reverse ETL model are associated with an entity model; and
the reverse ETL model further comprises synchronization schedule information associated with the table corresponding to the source.

9. The system of claim 8, the operations further comprising creating a mapping between the reverse ETL model and a destination of the one or more destinations.

10. The system of claim 9, the operations further comprising:
displaying one of at least the reverse ETL model, the entity model and the mapping between the reverse ETL model and the destination in a user interface (UI);
upon receiving user input indicative of a synchronization failure associated with the source or of a revision to the synchronization schedule information, updating the reverse ETL model; and
upon receiving user input indicative of a revision to the mapping between the reverse ETL model and the destination, updating the mapping.

11. A method comprising:
loading data from one or more customer data warehouses into a storage component using an ingest pipeline, the loading of the data comprising:
creating a source corresponding to a table in a customer data warehouse of the one or more customer data warehouses; and
creating a reverse extract-transform-load (ETL) model associated with the source, the reverse ETL model comprising a relational query comprising table information for the table, the reverse ETL model remaining unchanged upon detecting an update to a schema of the table;
receiving, at an enrichment pipeline, a data stream;
determining, by the enrichment pipeline, an insertion point within the data stream, the insertion point corresponding to a data object mention;
determining, by the enrichment pipeline, enrichment data matching the data object mention, the enrichment data being retrieved from the storage component;
augmenting, using the enrichment pipeline, the data stream with the enrichment data at the determined insertion point to generate an enriched data stream; and
transmitting the enriched data stream to one or more destinations.

12. The method of claim 11, wherein the ingest pipeline comprises a scheduler component that determines at least one of a timing or a frequency of data synchronization operations between the one or more customer data warehouses and the storage component.

13. The method of claim 12, wherein the ingest pipeline comprises a loader component, the loader component enabled to:
receive, from the scheduler component, synchronization information corresponding to a first job to be executed as part of an data ingest task;
upon receiving the synchronization information associated with the first job, creating a second job for a data processing engine based on the first job, the second job being associated with an application programming interface (API) to the storage component; and
execute the second job, the executing of the second job comprising one of at least a data write operation, data retrieval or data deletion operation associated with the storage component.

14. The method of claim 11, wherein:
the enrichment pipeline uses a data processing engine associated with an execution plan; and
upon receiving an incoming data stream and detecting that a downstream component is configured to receive an enriched data stream, adding an execution graph node to the execution plan for the data processing engine, the execution graph node associated with a call to an enrichment endpoint for an API to the storage component.

15. The method of claim 14, wherein the data object mention corresponds to an entity ID, and determining the insertion point within the incoming data stream comprises detecting the entity ID in the incoming data stream using a path rule and the enrichment endpoint for the API associated with the storage component.

16. The method of claim 15, wherein:
the enrichment data comprises one or more entity attributes, each entity attribute associated with at least one attribute value;
the enrichment data matching the data object mention comprises an entity attribute of the one or more entity attributes matching the entity ID based on a matching criterion; and
the enrichment data is retrieved from the storage component using the API.

17. The method of claim 11, wherein:
the source and the reverse ETL model are associated with an entity model; and
the reverse ETL model further comprises synchronization schedule information associated with the table corresponding to the source.

18. A non-transitory computer-readable storage medium, the computer-readable storage medium including instructions that when executed by a computer, cause the computer to:
- load data from one or more customer data warehouses into a storage component using an ingest pipeline, the loading of the data comprising:
  - creating a source corresponding to a table in a customer data warehouse of the one or more customer data warehouses; and
  - creating a reverse extract-transform-load (ETL) model associated with the source, the reverse ETL model comprising a relational query comprising table information for the table, the reverse ETL model remaining unchanged upon detecting an update to a schema of the table:
- receive, at an enrichment pipeline, a data stream;
- determine, by the enrichment pipeline, an insertion point within the data stream, the insertion point corresponding to a data object mention;
- determine, by the enrichment pipeline, enrichment data matching the data object mention, the enrichment data being retrieved from the storage component;
- augmenting, using the enrichment pipeline, the data stream with the enrichment data at the determined insertion point to generate an enriched data stream; and
- transmit the enriched data stream to one or more destinations.

* * * * *